(12) United States Patent
Wang et al.

(10) Patent No.: US 10,474,690 B2
(45) Date of Patent: Nov. 12, 2019

(54) DISJUNCTIVE RULE MINING WITH FINITE AUTOMATON HARDWARE

(71) Applicant: UNIVERSITY OF VIRGINIA PATENT FOUNDATION, Charlottesville, VA (US)

(72) Inventors: Ke Wang, Charlottesville, VA (US); Kevin Skadron, Charlottesville, VA (US); Elaheh Sadredini, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 349 days.

(21) Appl. No.: 15/475,819

(22) Filed: Mar. 31, 2017

(65) Prior Publication Data
US 2018/0285424 A1   Oct. 4, 2018

(51) Int. Cl.
*G06F 17/30*   (2006.01)
*G06F 16/2458*   (2019.01)

(52) U.S. Cl.
CPC ................................ *G06F 16/2465* (2019.01)

(58) Field of Classification Search
CPC ................................................... G06F 16/2465
USPC ................................................. 707/600–899
See application file for complete search history.

(56) References Cited

U.S. PATENT DOCUMENTS 6,651,049 B1* 11/2003 Agrawal ............. G06F 16/2465
707/694
2002/0124208 A1* 9/2002 Beer ....................... G06F 11/28
714/37

OTHER PUBLICATIONS

"Frequent Itemset Mining Dataset Repository", (2 pages).
"Documentation", Mircon Automata Processor (2015), (3 pages).
Aggarwal et al., "Frequent Pattern Mining", Springer, Cham (2014), (85 pages).
Agrawal et al., "Mining Sequential Patterns", In: Proc. of the International Conference on Data Engineering (ICDE), IEEE, (1995), pp. 3-14, (3 pages).
Agrawal et al., "Mining Association Rules between Sets of Items in Large Database", In: Proc. of SIGMOD '93, (1993), (10 pages).
Bo et al., "Entity Resolution Acceleration using Micron's Automata Processor", In: Proc. of the International Conference on Big Data (BigData) (2016), (6 pages).

(Continued)

*Primary Examiner* — Isaac M Woo
(74) *Attorney, Agent, or Firm* — Westerman, Hattori, Daniels & Adrian, LLP; Stephen B. Parker

(57) ABSTRACT

The present invention introduces the development of a flexible CPU-AP (Computer Processing Unit-Automata Processor) computing infrastructure for mining hierarchical patterns based on Apriori algorithm. A novel automaton design strategy, called linear design, is described to generate automata for matching and counting hierarchical patterns and apply it on SPM (Sequential Pattern Mining). In addition, another novel automaton design strategy, called reduction design, is described for the disjunctive rule matching (DRM) and counting. The present invention shows performance improvement of AP SPM and DRM solutions and broader capability over multicore and GPU (Graphics Processing Unit) implementations of GSP SPM, and shows that AP SPM and DRM solutions outperform state-of-the-art SPM algorithms SPADE and PrefixSpan (especially for larger datasets).

14 Claims, 20 Drawing Sheets

(56) References Cited

OTHER PUBLICATIONS

Chiang et al., "Mining disjunctive consequent association rules", Appl. Soft Comput. 11 (2011), pp. 2129-2133, (5 pages).
Cong et al., "A Sampling-based Framework for Parallel Data Mining", In: Proc. of the ACMSIGPLAN Symposium on Princeples and Practice of Parallel Programming (PPoPP), ACM (2005), (11 pages).
Dlugosch et al., "An Efficient and Scalable Semiconductor Architecture for Parallel Automata Processing", IEEE trans. Parallel Distrib. Syst. (2014), vol. 25, No. 12, pp. 3088-3098, (11 pages).
Fang et al., "Frequent Itemset Mining on Graphics Processors", In: Proc. International Workshop on Data Management on New Hardware (DaMoN), (2009), (9 pages).
Fournier-Viger et al., "SPMF: A Java Open-Source Pattern Mining Library", J. Mach. Learn. Res. 15, (2014), pp. 3569-3573, (5 pages).
Guralnik et al., "Parallel tree-projection-based sequence mining algorithms", Parallel Comput. 30(4), (2004), pp. 443-472, (30 pages).
Han et al., "Mining Frequent Patterns without Candidate Generation", In: Proc. of SIGMOD '00, ACM (2000), (12 pages).
Hryniów et al., "Parallel pattern mining—application of GSP algorithm for Graphics Processing Units", In: Proc. of the International Carpathian Control Conference (ICCC), IEEE, (2012), pp. 233-236, (4 pages).
Nanavati et al., "Mining Generalised Disjunctive Association Rules", In: Proc. of the Tenth International Conference on Information and Knowledge Management (CIKM), ACM, New York, NY, USA, (2001), pp. 482-489, (8 pages).
Noyes et al., "Mcron's Automata Processor Architecture: Reconfigurable and Massively Parallel Automata Processing", In: Proc. of the Fifth International Symposium on Highly-Efficient Accelerators and Reconfigurable Technologies, keynote presentation, (2014), (55 pages).
Pei et al., "Mining Sequential Patterns by Pattern-Growth: The PrefixSpan Approach", IEEE Trans. Knowl. Data Eng. (TKDE) 16(11), (2004), pp. 1424-1440, (17 pages).

Roy et al., "Discovering Motifs in Biological Sequences Using the Micron Automata Processor", IEEE/ACM Trans. Comput. Biol. Bioinform. 13(1), (2016), pp. 99-111, (13 pages).
Sampaio et al., "Mining Disjunctive Association Rules", (2008), (22 pages).
Shintani et al., "Mining Algorithms for Sequential Patterns in Parallel: Hash Based Approach", In: Proc. of the Second Pacific Asia Conference on Knowledge Discovery and Data mining, (1998), pp. 283-294, (12 pages).
Srikant et al., "Mining Sequential Patterns: Generalizations and Performance Improvements", In: Proc. of the International Conference on Extending Database Technology (EDBT), (1996), (15 pages).
Wang et al., "Association Rule Mining with the Micron Automata Processor", In: Proc. of the IEEE International Parallel and Distributed Processing Symposium (IPDPS), (2015), (11 pages).
Wang et al., "Sequential Pattern Mining with the Micron Automata Processor", In: Proc. of the ACM International Conference on Computing Frontiers, ACM, New York, NY, USA, CF '16 (2016a), (10 pages).
Wang et al., "Using the automata processor for fast pattern recognition in high energy physics experiments—A proof of concept", Nucl. Instrum. Methods Phys. Res. Sect. A: Accel., Spectrom., Detect. Assoc. Equip. 832, (2016b), pp. 219-230, (12 pages).
Zaki et al., "Scalable Algorithms for Association Mining", IEEE Trans. Knowl. Data Eng. (TKDE) 12(3), (2000), pp. 372-390, (3 pages).
Zaki e al., "Parallel Sequence Mining on Shared-Memory Machines", J. Parallel Distrib. Comput. 61(3), (2001a), pp. 401-426, (26 pages).
Zaki et al., "SPADE: An Efficient Algorithm for Mining Frequent Sequences", Mach. Learn. 42(12), (2001b), pp. 31-60, (30 pages).
Zhang et al., "Accelerating frequent itemset mining on graphics processing units", J. Supercomput. 66(1), (2013), 94-117, (24 pages).
Zu et al., "GPU-based NFA Implementation for Memory Effficient High Speed Regular Expression Matching", In: Porc. of the ACM SIGPLAN Symposium on Principles and Practice of Parallel Programming (PPoPP), ACM, (2012), pp. 129-140, (11 pages).

\* cited by examiner

DISJUNCTIVE RULE MINING WITH FINITE AUTOMATON HARDWARE

STATEMENT OF FEDERALLY SPONSORED RESEARCH/DEVELOPMENT

This invention was made with government support under Grant No. EF-1124931 awarded by the National Science Foundation and under Grant No. HR0011-13-3-0002 awarded by the Department of Defense/Defense Advanced Research Projects Agency (DARPA). The government has certain rights in the invention.

BACKGROUND

Pattern mining, a subfield of data mining, is a process of analyzing data from different perspectives to identify strong and interesting relations among variables in datasets. The traditional pattern mining techniques based on simple pattern structures, such as itemset mining and sub-string mining, are not capable of capturing hidden relations among variables in the datasets. Mining patterns with complicated structures becomes increasingly important in the 'Big Data' era. Two mining techniques for hierarchical patterns, sequential pattern mining (SPM) and disjunctive rule mining (DRM), have attracted a lot of attention in the field of data mining.

Sequential Pattern Mining (SPM) is a data mining technique, which identifies strong and interesting sequential relations among variables in structured datasets. SPM has become an important data mining technique with broad application domains, such as customer purchase patterning analysis, correlation analysis of storage systems, web log analysis, software bug tracking, and software API usage tracking [Document 3]. For example, a college student at the University of Virginia (UVA) buys textbooks according to his classes during his college years. Since every class has pre-requisite classes, a student normally follows the prerequisite order to buy and study textbooks accordingly. The UVA bookstore could study the frequent sequential patterns from the records of book purchases and give every student good recommendations for his/her next step of learning. SPM is a right technique to mine sequential relations from the records of transactions. Here, a sequential pattern refers to a hierarchical pattern consisting of a sequence of frequent transactions (itemsets) with a particular ordering among these itemsets. In addition to frequent itemset mining (FIM). SPM needs to capture permutations among the frequent itemsets. This dramatically increases the number of patterns to be considered and hence, the computational cost relative to simple set mining or string mining operations. In addition, as the sizes of interesting datasets keep growing, higher performance becomes critical to make SPM practical.

Many algorithms have been developed to improve the performance of SPM. Three most competitive algorithms today are Generalized Sequential Pattern (GSP) [Document 21], Sequential PAttern Discovery using Equivalence classes (SPADE) [Document 27] and PrefixSpan [Document 17]. SPADE and PrefixSpan are generally favored today and perform better than GSP on conventional single-core CPUs in average cases. However, the GSP is based on Apriori algorithm, which exposes massive parallelism and may be a better candidate for highly parallel architectures. Several parallel algorithms have been proposed to accelerate SPM on distributed-memory systems [Documents 8, 12, 20, and 26]. Increasing throughput per node via hardware acceleration is desirable for throughput as well as energy efficiency. However, even though hardware accelerators have been widely used in frequent set mining and string matching applications [Documents 10, 28, and 29], no hardware-accelerated solution for SPM has been proposed yet.

Disjunctive rule mining (DRM) is derived from frequent itemset mining, but allows "alternatives" for each item. For example, consider the bookstore story mentioned earlier. Each class recommends several reference books. Each student tends to select one or two reference books to buy together with the textbook for each class. Since the reference books are labeled as separate items, the strong relation between the textbook and one specific reference book may not be captured by traditional frequent itemset mining, but could be recognized by disjunctive rule mining when considering possible alternatives. The UVA bookstore could calculate the disjunctive rules from the records of book purchases and give every student good recommendations of reference books for each class. Several CPU algorithms [Documents 7, 15, and 19] were proposed to mine disjunctive rules effectively. However, no hardware-accelerated disjunctive rule mining method has been proposed yet.

The new Automata Processor (AP) [Document 9] offers an appealing accelerator architecture for hierarchical pattern mining. The AP architecture exploits the very high and natural level of parallelism found in DRAM (Dynamic Random Access Memory) to achieve native-hardware implementation of non-deterministic finite automata (NFAs). The use of DRAM to implement the NFA slates provides a high capacity: the first-generation boards, with 32 chips, provide approximately 1.5M automaton states. All of these states can process an input symbol and activate successor states in a single clock cycle, providing extraordinary parallelism for pattern matching. The AP's hierarchical, configurable routing mechanism allows rich fan-in and fan-out among states. These capabilities allow the AP to perform complex symbolic pattern matching and test input streams against a large number of candidate patterns in parallel. The AP has already been successfully applied to several applications, including regular expression matching [Document 9], DNA motif searching [Document 18], and frequent set mining [Documents 6, 22, and 24]. It has been previously shown [Document 23] that the AP can also achieve impressive speedups for mining hierarchical patterns. The present invention extends that prior work with additional capabilities and analysis.

Specifically, CPU-AP heterogeneous computing solutions are described to accelerate both SPM and DRM under the Apriori-based algorithm framework, whose multipass algorithms to build up successively larger candidate hierarchical patterns are best suited to the AP's highly parallel pattern-matching architecture, which can check a large number of candidate patterns in parallel. The present invention extends the prior AP-SPM work [Document 23] with disjunctive capabilities and describes a flexible framework for mining hierarchical patterns such as sequential patterns and disjunctive rules with hardware accelerators. Designing compact NFAs is a critical step to achieve good performance of AP-accelerated SPM and DRM. The key idea of designing an NFA for SPM is to flatten sequential patterns to strings by adding an itemset delimiter and a sequence delimiter. This strategy greatly reduces the automaton design space so that the template automaton for SPM can be compiled before runtime and replicated to make full use of the capacity and massive parallelism of the AP board. The described NFA design for recognizing disjunctive rules utilizes the on-chip Boolean units to calculate AND relations among disjunctive items ("d-item" in short, an item allowing several alternatives), but takes full use of the bit-wise parallelism appearing in the state unites of the AP chips to calculate OR relations of items within a d-item.

On multiple real-world and synthetic datasets, the performance of the described AP-accelerated SPM is compared against CPU and GPU implementations of GSP, an Apriori based algorithm, as well as Java multi-threaded implementations of SPADE and PrefixSpan [Document 11]. The performance analysis of the AP-accelerated SPM shows up to 90× speedup over the multicore CPU GSP and up to 29× speedups over the GPU GSP version. The described approach also outer-forms the Java multi-threaded implementations of SPADE and PrefixSpan by up to 452× and 49× speedups. The described AP-accelerated SPM also shows good performance scaling as the size of the input dataset grows, achieving even better speedup over SPADE and PrefixSpan. The input size scaling experiments also show that SPADE fails at some datasets larger than 10 MB (a small dataset size, thus limiting utility of SPADE in today's 'big data' era).

The described CPU-AP DRM solution shows up to 614× speedups over sequential CPU algorithm on two real-world datasets. The experiments also show a significant increase of CPU matching-and-counting time when increasing the d-rule size or the number of alternative items but constant AP processing time with increasing complexity of disjunctive patterns. This analysis extends the prior analysis [Document 23] with Boolean-based pattern matching including analysis of disjunctive features.

The present invention has the following goats:
1. To develop a flexible CPU-AP computing infrastructure for mining hierarchical patterns based on Apriori algorithm;
2. To describe a novel automaton design strategy, called linear design, to generate automata for matching and counting hierarchical patterns and apply it on SPM. This strategy flattens the hierarchical structure of patterns to strings and adopts a multiple-entry scheme to reduce the automaton design space for candidate patterns;
3. To describe another novel automaton design strategy, called reduction design, for the disjunctive rule matching and counting. This strategy takes full use of the bit-wise parallelism of the state units on the AP chips to discover the optionality of items on a lower level and utilizes Boolean units on The AP chip to identify occurrences of items on a higher level; and
4. To show performance improvement of AP SPM and DRM solutions and broader capability over multicore and GPU implementations of GSP SPM, and to show dial AP SPM and DRM solutions outperform state-of-the-art SPM algorithms SPADE and PrefixSpan (especially for larger datasets).

Related Work

Because of the larger permutation space and complex hierarchical patterns involved, performance is a critical issue for applying hierarchical pattern mining techniques. Many efforts have been made to speed up hierarchical pattern mining via software and hardware.

Sequential Pattern Mining

Sequential Algorithms

Generalized Sequential Pattern GSP [Document 21] follows the multi-pass candidate generation-pruning scheme of the classic Apriori algorithm and inherits the horizontal data format and breadth-first-search scheme from it Also in the family of the Apriori algorithms. Sequential PAttern Discovery using Equivalence classes (SPADE) [Document 27] was derived from the concept of equivalence class [Document 25] for sequential pattern mining and adopted the vertical data representation. To avoid the multiple passes of candidate generation and pruning steps, PrefixSpan [Document 17] algorithm extended the idea of the pattern growth paradigm [Document 13] to sequential pattern mining.

Parallel Implementations

Shintani and Kitsuregawa [Document 20] proposed three parallel GSP algorithms on distributed memory systems. These algorithms show good scaling properties on an IBM SP2 cluster. Zaki [Document 26] designed pSPADE, a data-parallel version of SPADE for fast discovery of frequent sequences in large databases on distributed-shared memory systems, and achieved up to 7.2× speedup on a 12-processor SGI Origin 2000 cluster. Guralnik and Karypis [Document 12] developed tree-projection-based parallel sequence mining algorithms for distributed-memory architectures and achieved up to 30× speedups on a 32-processor IBM SP cluster. Cong [Document 8] presented a parallel sequential pattern mining algorithm (Par-ASP) under their sampling-based framework for parallel data mining, implemented by using MPI over a 64-node Linux cluster, achieving up to 37.8× speedup.

Accelerators

Hardware accelerators allow a single node to achieve orders of magnitude improvements in performance and energy efficiency. General-purpose graphics processing units (CPUs) leverage high parallelism, but GPUs' single instruction multiple data (SIMD), lockstep organization means that the parallel tasks must generally be similar. Hryniów [Document 14] presented a parallel GSP implementation on GPU. However, this work did not accelerate sequential pattern mining, instead relaxed the problem to an itemset mining. There has been no previous work on hardware acceleration for true SPM. In particular, SPADE and PrefixSpan have not been implemented on GPU. In the present invention, true GSP for SPM is implemented on GPU.

Disjunctive Rule Mining

Nanavati [Document 15] first introduced the concept of disjunctive rules and did conceptual and algorithmic studies on disjunctive rules of both inclusive OR and exclusive OR. Sampaio [Document 19] developed a new algorithm to induce disjunctive rules under certain restrictions to limit the search spaces of the antecedent and consequent terms. Chiang [Document 7] proposed disjunctive consequent association rules, a conceptual combination of the disjunctive rule and the sequential pattern, and illustrated the promising commercial applications of this new mining technique. However, all of these existing works focused on effectiveness more than the efficiency of the implementations.

The Automata Processor shows great potential in boosting the performance of massive and complex pattern-searching applications. The present invention describes that the AP-accelerated solutions for sequential pattern mining and disjunctive rule mining have great performance advantages over the CPU and other parallel and hardware-accelerated implementations.

DOCUMENT LISTS

1. Frequent itemset mining dataset repository. http://fimi.ua.ac.be/data/.
2. (2015) Micron Automata Processor website, http://www.micronautomata.com/documentation.

3. Aggarwal, C. C., Han, J. (eds.): Frequent Pattern Mining. Springer, Cham (2014).
4. Agrawal, R., Srikant, R.: Mining sequential patterns. In: Proc. of the International Conference on Data Engineering (ICDE). IEEE, pp. 3-14 (1995).
5. Agrawal, R., Imieliński, T., Swami, A,.: Mining association rules between sets of items in large databases. In: Proc. of SIGMOD '93 (1993).
6. Bo, C. et al,: Entity resolution acceleration using microns automata processor. In: Proc. of the International Conference on Big Data (BigDaia) (2016).
7. Chiang, D. A., Wang, Y. F., Wang, Y. H., Chen, Z. Y., Hsu, M. H.: Mining disjunctive consequent association rules. Appl. Soft Comput. 11(2), 2129-2133 (2011).
8. Cong, S., Han, J., Hoeflinger, J., Padua, D.: A sampling-based framework for parallel data mining. In: Proc. of the ACMSIGPLAN Symposium on Principles and Practice of Parallel Programming (PPoPP), ACM (2005).
9. Dlugosch, P., ct al.: An efficient and scalable semiconductor architecture for parallel automata processing. IEEE Trans. Parallel Distrib. Syst 25(12). 3088-3098 (2014).
10. Fang, W. et al,: Frequent itemset mining on graphics processors. In: Proc. International Workshop on Data Management on New Hardware (DaMoN) (2009).
11. Founrnier-Viger, P., et al,: Spmf: a Java open-source pattern mining library. J. Mach. Learn. Res. 15, 3569-3573 (2014).
12. Guralnik. V., Karypis, G.: Parallel tree-projection-based sequence mining algorithms. Parallel Comput. 30(4), 443-472 (2004).
13. Han, J., Pei, J., Yin, Y.: Mining frequent patterns without candidate generation. In: Proc. of SIGMOD '00, ACM (2000).
14. Hrynidów, K.: Parallel pattern mining-application of gsp algorithm for graphics processing units. In: Proc. of the International Carpathian Control Conference (ICCC), IEEE, pp. 233-236(2012).
15. Nanavati, A. A., Chitrapura, K. P., Joshi, S., Krishnapuram, R.: Mining generalised disjunctive association rules. In: Proc. of the Tenth International Conference on Information and Knowledge Management (CIKM), ACM, New York, NY, USA, pp. 482-189 (2001).
16. Noyes, H.: Micron automata processor architecture: Reconfigurable and massively parallel automata processing. In: Proc. of the Fifth International Symposium on Highly-Efficient Accelerators and Reconfigurable Technologies, keynote presentation (2014).
17. Pei, J., et al,: Mining sequential patterns by pattern-growth: the prefix span approach. IEEE Trans. Knowl, Data Eng. (TKDE) 16(11), 1424-1440 (2004).
18. Roy, L., Aluru, S.: Discovering motifs in biological sequences using the micron automata processor. IEEE/ACM Trans. Comput. Biol. Bioinform. 13(1), 99-111 (2016).
19. Sampaio, M. C., Cardoso, O. H. B., Santos, G P D., Haltori, L.: Mining disjunctive association rules (2008).
20. Shintani, T., Kitsuregawa, M.: Mining algorithms for sequential patterns in parallel: Hash based approach. In: Proc. of the Second PacificAsia Conference on Knowledge Discovery and Data mining, pp. 283-294 (1998).
21. Srikant, R., Agrawal, R.: Mining sequential patterns: Generalizations and performance improvements. In: Proc. of the International Conference on Extending Database Technology (EDBT) (1996).
22. Wang, K., Qi, Y., Fox, J., Stan, M., Skadron, K.: Association rule mining with the micron automata processor. In: Proc. of the IEEE International Parallel and Distributed Processing Symposium (IPDPS) (2015).
23. Wang, K., Sadredini, E., Skadron, K.: Sequential pattern mining with the micron automata processor. In: Proc. of the ACM International Conference on Computing Frontiers, ACM, New York, NY, USA, CF '16 (2016a).
24. Wang, M. H., et al.: Using the automata processor for fast pattern recognition in high energy physics experimentsa proof of concept. Nucl. Instrurn. Methods Phys. Res. Sect A: Accel., Spectrom., Detect. Assoc. Equip. 832, 219-230 (2016b).
25. Zaki, M. J.: Scalable algorithms for association mining. IEEE Trans. Knowl. Data Eng. (TKDE) 12(3), 372-390 (2000).
26. Zaki, M. J.: Parallel sequence mining on shared-memory machines. J. Parallel Disirib. Comput. 61(3), 401-426 (2001a).
27. Zaki, M. J.: Spade: an efficient algorithm forming frequent sequenoes.Mach, Learn. 42(12), 31-60 (2001b).
28. Zhang, F., Zhang, Y., Bakos, J. D.: Accelerating frequent itemset mining on graphics processing units. J, Supereomput 66(1), 94-117 (2013).
29. Zu, Y. et al.: GPU-bascd NFA implementation for memory efficient high speed regular expression matching. In: Proc. of the ACM SIGPLAN Symposium on Principles and Practice of Parallel Programming (PPoPP), ACM, pp. 129-140 (2012).

SUMMARY

An aspect of an embodiment of the present invention provides, among other things, a flexible hardware-accelerated framework for therarchical pattern mining problems. Under this framework, sequential pattern mining (SPM) and disjunctive rule mining (DRM) are accelerated on the new Automata Processor (AP), which provides native hardware implementation of non-deterministic finite automata. Two automaton design strategies, linear design and reduction design, are described and tested for SPM and DRM, respectively, and have shown to effectively leverage highly-parallel automata hardware such as the AP.

The described CPU-AP solution for SPM adopts the Generalized Sequential Pattern (GSP) algorithm from the Apriori family, based on the downward-closure property of frequent sequential patterns. A compact automaton design is derived for matching and counting frequent sequences. The linear design strategy designs automata for SPM by flatting therarchical patterns of sequences into plain strings with delimiters and place-holders. A multiple-entry NFA strategy is described to accommodate variable-structured sequences. This allows a single, compact template to match any candidate sequence of a given length, so this template can be replicated to make full use of the capacity and massive parallelism of the AP. GSP is compared across different hardware platforms. Up to 430×, 90×, and 29× speedups are achieved by the AP-accelerated GSP on six real-world datasets, when compared with the single-threaded CPU. multicore CPU, and GPU GSP implementations. The AP-accelerated SPM also outperforms PrefixSpan and SPADE on multicore CPU by up to 300× and 30×. By parallelizing candidate generation, these speedups are further improved to 452× and 49×. Even more performance improvement can be achieved with hardware support to minimize symbol replacement latency. The described AP solution shows good scaling properties for larger datasets, while the alternatives scale poorly.

Another aspect of an embodiment of the present invention provides, among other things, an automaton design for matching and counting disjunctive rules efficiently to accelerate DRM by using the AP. This automaton design follows the reduction design strategy and utilizes the on-chip Boolean (AND) gates to implement the reduction operations among d-rules, and the bitwise parallelism feature of STEs to deal with the OR operations among items in one d-item. The experiments show up to 614× speedups of the described CPU-AP DRM solution over sequential CPU algorithm on two real-world datasets. The experiments also demonstrate significant increase on the CPU matching-and-counting time when increasing d-rule size or the number of alternative items. In contrast, the d-rule recognition time on the AP is two orders of magnitudes faster than the CPU version and keeps invariant despite the increasing complexity of d-rules.

BRIEF DESCRIPTION OF THE DRAWINGS

For a better understanding of the aforementioned embodiments of the invention as well as additional embodiments thereof, reference should be made to the Description of Illustrative Embodiments below, in conjunction with the following drawings in which like reference numerals refer to corresponding parts throughout the figures.

DESCRIPTION OF ILLUSTRATIVE EMBODIMENTS

Figure 1:
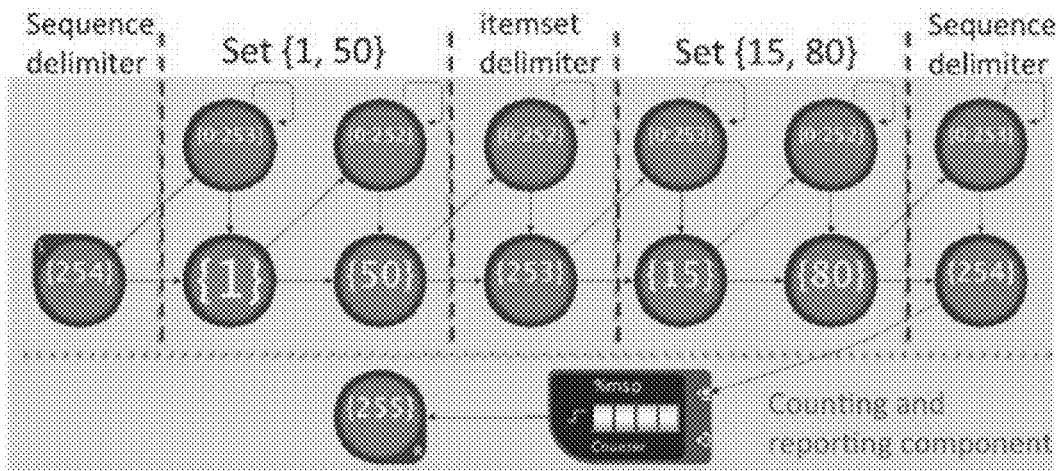
FIGS. 1(a) and (b) illustrate examples of automaton design for sequential pattern matching and counting in accordance with some embodiments. Blue circles and black boxes are STEs and counters, respectively. The numbers on an STE represent the symbol set that STE can match. "0:252" means any item ID in the range of ASCII 0-252. Symbols "255". "254", and "253" are reserved as the input ending, sequence delimiter, and itemset delimiter, respectively.
Figure 1:
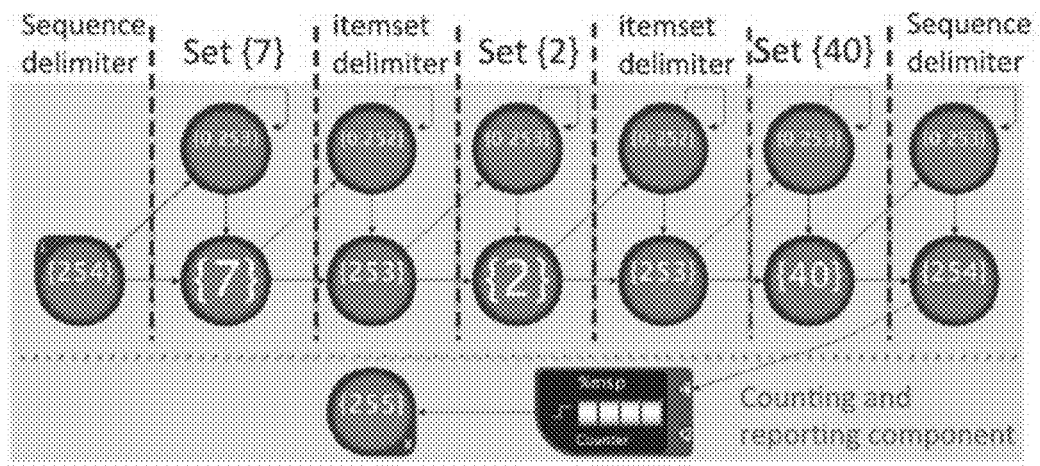

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

Sequential Pattern Mining
Introduction to SPM

Sequential pattern mining (SPM) was first described by Agrawal and Srikanl [Document 4], SPM finds frequent sequences of frequent itemsets. All the items in one itemset have the same transaction time or happen within a certain window of time, but in SPM. the order among item-sets/transactions matters. In short, SPM looks for frequent permutations of frequent itemsets, which in turn are frequent combinations of items. FIM takes care of the items that are purchased together; for example, "7% of customers buy laptop, flash drive, and software packages together"; whereas in SPM, the sequence in which the items are purchased matters, e.g., "6% of customers buy laptop first, then flash drive, and then software packages".

In a mathematical description, $I=i_1, i_2, \ldots, i_m$ is defined as a set of items, where $i_k$ is usually represented by an integer, called as an item ID. Let $s=<t_1 t_2 \ldots t_n>$ denotes a sequential pattern (or sequence), where $t_k$ is a transaction and also can be called as an itemset. An element of a sequence is defined by $t_j=\{x_1, x_2, \ldots, x_m\}$. where $x_k \in I$. In a sequence, one item may occur just once in one transaction, but may appear in many transactions. It is assumed that the order within a transaction (itemset) does not matter, so the items within one transaction can be lexicographically ordered in preprocessing stage. The size of a sequence is delined as the number of items in it. A sequence with a size k is called a k-sequence. Sequence $s_1=<t_1 t_2 \ldots t_m>$ is called a subsequence of $s_2=<r_1 r_2 \ldots r_j>$ if there are integers $1 \leq k_1 < k_2 < \ldots < k_{m-1} < k_m \leq j$ such that $t_1 \subseteq r_{k1}, t_2 \subseteq r_{k2}, \ldots, t_m \subseteq r_{km}$. Such a sequence $s_j$ is called a sequential pattern. The support for a sequence is the number of total data sequences that contains this sequence. A sequence is known as frequent iff its support is greater than a given threshold value called minimum support, minsup. The goal of SPM is to find out all the sequential patterns whose supports are greater than minsup.

Generalized Sequential Pattern Framework

The GSP method, a member in the Apriori family, is based on the downward-closure property and represents the dataset in a horizontal format The down ward-closure property means all the subsequences of a frequent sequence are also frequent and thus for an infrequent sequence, all its super-sequences must also be infrequent In GSP, candidates of (k+1)-sequences are generated from known frequent k-sequences by adding one more possible frequent item. The mining begins with 1-sequences, and the size of candidate sequences increases by one with each pass. In each pass, the GSP algorithm has two major operations:

1. Candidate Generation: generating candidates of frequent (k+1)-sequences from known frequent k-sequences; and
2. Matching and Counting: Matching candidate sequences and counting support.

Sequence Candidates Generation

In GSP, the candidates of (k+1)-sequences are generated by joining two k-sequences that have the same contiguous subsequence, c is a contiguous subsequence of sequence $s=<t_1 t_2 \ldots t_n>$ if one of these conditions bold:

TABLE 1

Example of candidate generation

| Frequent 3-sequences | Candidate 4-sequences | |
|---|---|---|
| | Joined | Pruned |
| < {B} {C} {E} > | < {A, B} {C} {E} > | < {A, B} {C, D} > |
| < {A, B} {C} > | < {A, B} {C, D} > | |
| < {B} {C, D} > | | |
| < {A} {C, D} > | | |
| < {A, B} {D} > | | |

1. c is derived from s by deleting one item from either $t_1$ or $t_n$;
2. c is derived from s by deleting an item from an transaction $t_i$ which has at least two items; and
3. c is a contiguous subsequence of $c^1$, and $c^1$ is a contiguous subsequence of s.

Candidate sequences are generated in two steps as follows:

Joining phase: Two k-sequence candidates ($s_1$ and $s_2$) can be joined if the subsequence formed by dropping the first item in $s_1$ is the same as the subsequence formed by dropping the last items in $s_2$. Consider frequent 3-sequences $s_1=<\{A, B\} \{C\}>$ and $s_2=<\{B\} \{C\} \{E\}>$ in Table 1; dropping the first items in $s_1$ results in $<\{B\} \{C\}>$ and dropping the last element in $s_2$ results in $<\{B\} \{C\}$. Therefore, $s_1$ and $s_2$ can get joined to a candidate 4-sequence $s_3=<\{A, B\} \{C\} \{E\}>$. Note that here $\{E\}$ will not merge into the last itemset in the $s_1$, because it is a separate element in $s_2$.

Pruning Phase: If a sequence has any infrequent subsequence, this phase must delete this candidate sequence. For example, in Table 1, candidate $<\{A, B\} \{C\} \{E\}>$ gets pruned because subsequence $<\{B\} \{C\} \{E\}>$ is not a frequent 3-sequence.

Matching and Counting

The matching-and-counting stage counts how many times an input matches a sequence candidate. The occurrence of each candidate pattern is recorded and compared with the minimum support number. The matching-and-counting stage is the performance bottleneck for GSP, but it exposes massive parallelism. The high density of on-chip slate elements and fine-granularity communication found on the AP allows many candidate sequences (patterns) to be matched in parallel, and make APa promising hardware performance booster for matching and counting operations of GSP. For this reason, the GSP algorithm becomes a natural choice for mapping SPM onto the AP. The present invention describes how to utilize the AP to speed up the matching-and-counting stage of GSP and how this solution compares with other parallel or accelerator implementations of SPM. For comparison purpose. OpenMP and CUDA implementations for multicore CPU and GPU are described to speed up the matching and counting of GSP.

Disjunctive Rule Mining

Introduction to DRM

Disjunctive Rule Mining (DRM) is derived from frequent set mining [Document 5]. In the DRM problem, $I=i_1, i_2, \ldots, i_m$ is defined as a set of interesting items, Let $T=t_1, t_2, \ldots, t_n$ be a dataset of transactions, where each transaction $t_j$ is a subset of I. Define $x_j=\{i_{s1}, i_{s2}, \ldots, i_{sl}\}$ to be a set of items in I, called an itemset in traditional frequent set mining. Define $y_j=\{d_{s1}, d_{s2}, \ldots, d_{sl}\}$ to be a set of disjunctive items (d-items), called a disjunctive rule in DRM, where each d-item $d_{sj}=<i_{m1}, i_{m2} \ldots i_{mw}>$ a set of alternative items, w is the max number of alternative items that could appear in one d-item. Duplicate items are not allowed in a disjunctive rule.

The d-rule with k d-items is called k-d-rule. A d-item $d_r$ is said to cover an item $i_s$ iff $i_s \in d_r$. A transaction $t_p$ is said to cover the d-rule $y_q$ iff each d-item $y_q$ covers one item of $t_p$. The support of $y_q$, $Sup(y_q)$, is the number of transactions that covers it. A d-rule is known as frequent iff its support is greater than a given threshold value called minimum support, minsup. The goal of disjunctive rule mining is to find out all d-rules. whose supports are greater than minsup.

Apriori and Downward-Closure

In DRM, the downward-closure means all the subsets of a frequent d-rule are also frequent and thus for an infrequent d-rule, all its supersets must also be infrequent. The downward-closure is valid when considering the relations among d-rules. On the contrary, an upward-closure is valid when considering the items within a d-item. That is, for a frequent d-rule $y_q$, a new d-rule $y'_q$ with one more alternative item in any d-item must be frequent.

Algorithm Framework

Given both downward-closure and upward-closure properties described above, an Apriori is implemented like algorithm. The mining begins at 2-d-rules and increases the size of d-rules by one with each outer iteration. In each inner iteration, infrequent d-rules are picked up to generate new d-rules by adding one alternative item to any possible d-item. The algorithm will take the following steps:

1. Candidate Generation:
   (a) d-rule size-increase iteration: generating candidates of frequent (k−1)-d-rules from the known frequent k-d-rules; and
   (b) d-item size-increase iteration: generating candidates of frequent k-d-rules from the known infrequent k-d-rules,
2. Matching and Counting: Matching Candidate D-Rules and Counting Supports.

Matching and Counting

The matching-and-counting stage counts how many times the input matches a d-rule. The occurrence of each candidate d-rule is recorded and compared with the minimum support number. When considering both the OR relations among items of each d-item and the AND relations among d-items, the CPU implementation takes a longer time to match a d-rule than a itemset. In addition to the high capacity of state units on the AP chips, which allows massively parallel matching and counting on a large number of d-rules. the sub-set matching nature of AP state units makes it no extra cost in calculating OR relations among items of each d-item. Therefore, in practical cases, the runtime of CPU-implemented matching and counting will increase along the complexity of a d-rule (d-rule size and the total number of alternative hems). In contrast, the AP matching-and-counting lime will keep constant and is two orders of magnitude faster than the CPU version.

Automata Processor

Architecture

The AP chip has three types of functional elements—the state transition element (STE), counters, and Boolean elements [Document 9]. The STE is the central feature of the AP chip and is the element with the highest population density. An STE holds a subset of 8-bit symbols via a DRAM column and represents an NFA state, activated or deactivated, via a one-bit register along with the matching rule for that state. The AP archictecture achieves fine-granularity (bit-wise) parallelism at the scale of entire row of the memory, every cycle. The high parallelism is achieved in two places:

1. Activating the row in each subarray that corresponds to the matching rules for the entire system in response to the input symbol; and
2. Operating directly on the row buffer to complete the process of checking the input symbol against all possible transitions, by doing the OR in each column of the matching rule with the active vector.

Therefore, when any symbol of the symbol set compiled on one activated STE is seen, the STE "matches" and produces a high signal. That is, the OR operations are implicitly applied among the symbols complied on an STE. This feature, as a pan of bit-wise parallelism, could be utilized for efficient disjunctive rule mining. The AP uses a homogeneous NFA representation [Document 9] for a more natural match to the hardware operation. In terms of Flynn's taxonomy, the AP is therefore a very unusual multiple-instruction, single-data (MISD) architecture: each state (column) holds unique responses (instructions) to potential inputs, and they all respond in parallel to each input. Most other commercial architectures are von Neumann architectures, e.g. single CPU cores (SISD), multicore or multiprocessors (MIMD), and GPUs (SIMD).

The counter element counts the occurrence of a pattern described by the NFA connected to it and activates other elements or reports when a given threshold is reached. One counter can count up to $2^{12}-1$. Two or more counters can be daisy-chained to handle larger threshold. Counter elements are a scarce resource of the AP chip, and therefore, become an important limiting factor for the capacity of the SPM automaton described in the present invention.

The Boolean element is programmable and could be configured to one of nine different Boolean gates including AND, OR, NOT, SOP (sum of product), and POS (product of sum). The AND gate supports up to seven fan-in connections. However, due to the available routing resource, it is hard to reach this limitation in practical cases.

The current generation AP-D480 boards use AP chips built on 50 nm DRAM technology, running at an input symbol (8-bit) rate of 133 MHz. Each D480 chip has 192 blocks, with 256 STEs, 4 counters, and 12 Boolean elements per block [Document 9]. Assuming an AP board with 32 AP chips, all AP chips process input data stream in parallel. The projected power consumption of a 32-chip AP board is about 155 W.

Input and Output

The AP lakes input streams of 8-bit symbols. Any STE can be configured to accept the first symbol in the stream (called start-of-data mode, small "1" in the left-upper corner of STE in the following automaton illustrations), to accept every symbol in the input stream (called all-input mode, small "∞" in the left-upper comer of STE in the following illustrations) or to accept a symbol only upon activation.

Any type of element on the AP chip can be configured as a reporting element; one reporting element generates a one-bit signal when it matches the input symbol. If any reporting element reports on a particular cycle, the chip will generate an output vector, which contains 1s in positions corresponding to the elements that report and 0s for reporting elements that do not report. Too-frequent outputs will cause AP stalls. Therefore, minimizing output vectors is an important consideration for performance optimization.

Programming and Configuration

The AP SDK provides the Automata Network Markup Language (ANML), an XML-like language for describing automata networks, as well as C, Java, and Python bindings to describe automata networks, create input streams, parse output, and manage computational tasks on the AP board. A "macro" is a container of automata for encapsulating a given functionality, similar to a function or subroutine in common programming languages.

Deploying automata onto the AP fabric involves two stages: placement-and-routing compilation (PRC) and loading (configuration) [Document 2]. In the PRC stage, the AP compiler deduces the best element layout and generates a binary version of the automata network. In the cases of large number of topological identical automata, macros or templates can be precompiled in PRC stage and composed later [Document 18]. This shortens PRC time, because only a small automata network within a macro needs to be processed, and then the board can be tiled with as many of these macros as fit.

A pre-compiled automata only needs the loading stage. The loading stage, which needs about 50 milliseconds for a whole AP board [Document 18], includes two steps: routing configuration/reconfiguration that programs the connections, and the symbol set configuration/reconfiguration that writes the matching rules for the STEs. The changing of STE rules only involves the second step of loading, which fakes 45 milliseconds for a whole AP board. The feature of fast partial reconfiguration plays a key role in a successful AP implementation of SPM: the fast symbol replacement helps to deal with the case that the total set of candidate patterns exceeds the AP board capacity; the quick routing reconfiguration enables a fast switch from k to k+1 level in a multiple-pass algorithm like GSP for sequence mining.

Mapping SPM onto the AP

The general framework for AP-accelerated hierarchical pattern mining is to generate candidate patterns on the CPU and utilize the high parallelism of the AP chips to speedup performance bottleneck of matching-and-counting steps. For SPM, the GSP algorithm, a variant of the Apriori algorithm for SPM, is adopted to generate candidates for sequential patterns.

Automaton for Matching and Counting

The hierarchical patterns in SPM, sequences of itemsets, are more complex than strings or individual itemsets as studied in previous works [Documents 18 and 22]. Within itemsets of a sequence, items of interest may be discontinuous [Document 22]. Furthermore, one input sequence may have irrelevant itemsets in between interesting itemsets. The matching part of the automaton for SPM should identify the interesting itemsets as well as the order among the itemsets. In summary, the automaton design needs to deal with all possible continuous and discontinuous situations for both items and itemsets, and keep the order among itemsets at the same time. There is no previous work that has proposed any automation design for hierarchical pattern matching. Furthermore, in order to maximize benefit from the high parallelism of NFAs, and the AP in particular, an appropriate automaton structure must be as compact as possible, to maximize the number of such structures that can be accommodated in a single pass.

Flattening the Hierarchy of Sequential Patterns

To match sequences of itemsets, sets are first converted into strings with a pre-defined order. Then, a delimiter is introduced for itemsets to bound and connect these strings (converted from itemsets) within a sequential pattern. The sequence of strings is also a string. Based on this observation, the hierarchy of a sequence of itemsets is therefore flattened to a discontinuous sequence-matching problem. This is the key innovation of described automaton design for SPM.

FIG. 1 shows the automaton design for sequential pattern matching and counting. In the examples shown here, the items are coded as digital numbers in the range from 0 to 252, with the numbers 255, 254, 253 reserved as the data-ending reporting symbol, sequence delimiter, and itemset delimiter, respectively. Other choices of these three special symbols also work well under the described algorithm framework. In the case of more than 253 frequent items, two consecutive STEs are used to represent an item and support up to 64,009 (253×253) frequent items, which is sufficient in all the datasets examined; because the AP native symbol size is 8 bits, this will require two clock cycles to process each 16-bit symbol. Even larger symbol alphabets are possible by longer consecutive sequences of STEs. In FIG. 1, the counting and reporting component is shown below the (orange) dotted line. The I/O optimization strategy proposed in [Document 22] is adopted by delaying all reports from frequent patterns to the last cycle.

The STEs for matching sequential patterns are shown above the orange dotted line. One matching NFA is bounded by a starting sequence delimiter for starting a new sequence and an ending sequence delimiter (the same symbol) for activating the counting-and-reporting component. In contrast to the set-matching NFAs proposed in [Document 22], the NFA for SPM is divided into several itemsets, demarcated by the itemset delimiters. Each NFA has two rows of STEs. The bottom row is for the actual symbols in a candidate sequential pattern. The STEs in the top row, called "position holders", help to deal with the discontinuous situations (within itemsets or between itemsets). Each "position holder" has a self-activation connection and matches all valid symbols (excluding the delimiters). As long as the input symbol stays in range, the "position holder" will stay activated and keep activating the next STE in the bottom row. The key idea to implement hierarchical pattern matching with the flattened automaton design is to define two types of "position holder": "itemset position holder" and "item position holder". In the case of sequential pattern, the first "position holder" in each itemset should be an itemset position holder, 0:253. It will stay activated before the end of a sequence and handle discontinuous itemsets within that sequence. The other "position holders" are "item position holders", 0:252, which only hold the position within an input itemset. In the example shown in FIG. 1(a), any other itemsets except a superset of {1,50}, will not reach the itemset delimiter. After a superset of {1,50} is seen, the "position holder" above STE "15" will hold. The position (activate itself) until the end of the same input sequence. Namely, after a superset of {1,50} is seen, the itemsets other than the superset of {15,80} are ignored before a superset of {15,80} appears in the same input sequence. Note that more sophisticated hierarchical patterns, such as sequences of sequences or patterns of more than a two-level hierarchy, can be implemented using the same idea.

The only difference between an "item position holder" and an "itemset position holder" are their symbol set. One important advantage of the flattened automaton design is that one such automaton structure can deal with all situations of the same encoded pattern length (the encoded pattern length includes. The itemset delimiters). This feature greatly reduces the design space of sequential pattern matching automaton. For example the automaton structure in FIG 1 can deal with all these cases: <{a,b,c,d,e}>, <{a} {b,c,d}>, <{a,b} {c,d}>, <{a,b,c} {d}>, <{a} {b} {c}>. The actual item IDs are defined in a sequential pattern without counting delimiters as "effective items," and the pattern that considers the itemset delimiters is defined as "encoded pattern." In this step, the automaton design space for a given length of "encoded pattern" is reduced to one. If one item in the bottom line is regarded as a node, and The position holder above it is regarded as a super node, the matching will proceed from the left to the right linearly. Therefore, the strategy of flatting hierarchical patterns into string patterns is called as linear design strategy.

Multiple-entry NFAs

In each GSP level, there could be 0 to k−1 delimiters in actual patterns, and the encoded pattern lengths of level k can vary from k (a sequence consisting of a single itemset) to k+k−1 (all the itemsets only have a single item, so there are k−1 itemset delimiters). Because candidate sequences are generated at runtime, the number of patterns to be checked for a given encoded length is not known before runtime. A further step is needed to reduce the automaton design space of the candidates for each GSP iteration to one single template, so that the place and routing can be done before runtime.

Figure 2:
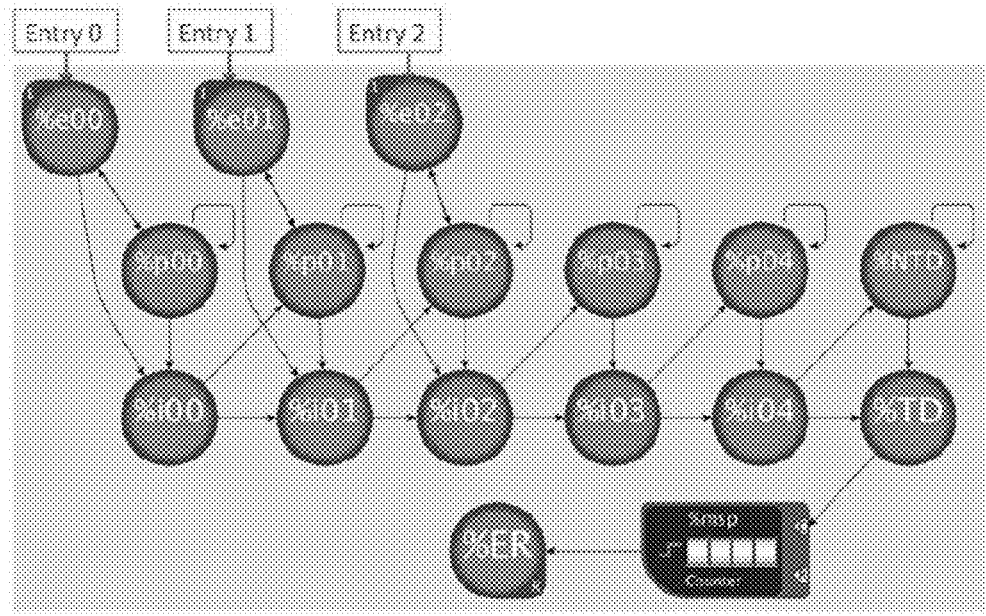
FIGS. 2(a)-(d) illustrate a small example of multiple-entry NFA for all possible sequences of effective size 3 in accordance with some embodiments, (a) is the macro of this ME-NFA-VSI with parameters, (b) is automaton for sequence <{12,79,96}>. (c) is automaton for sequence <{33,80} {11}>. d) is automaton for sequence <{17} {2} {90}>.
Figure 2:
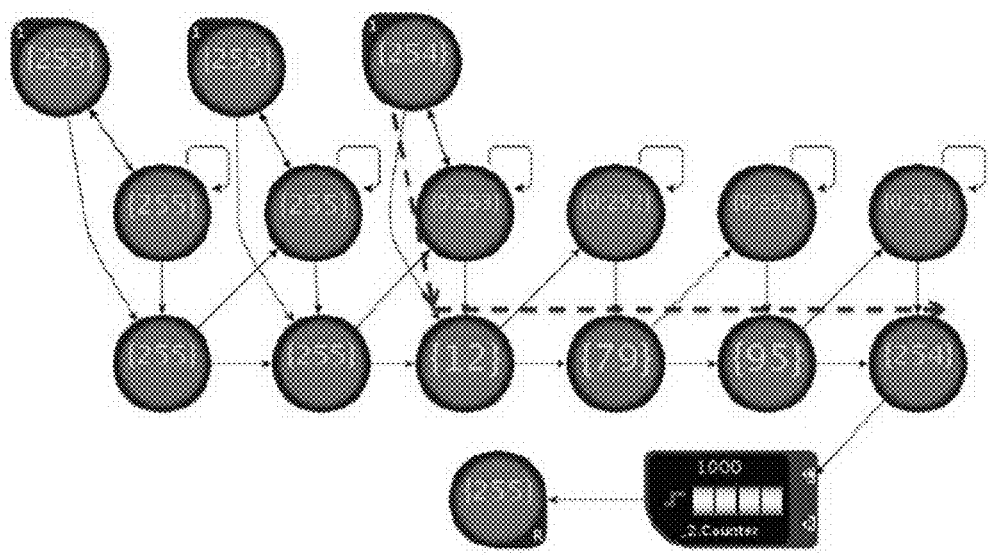
Figure 2:
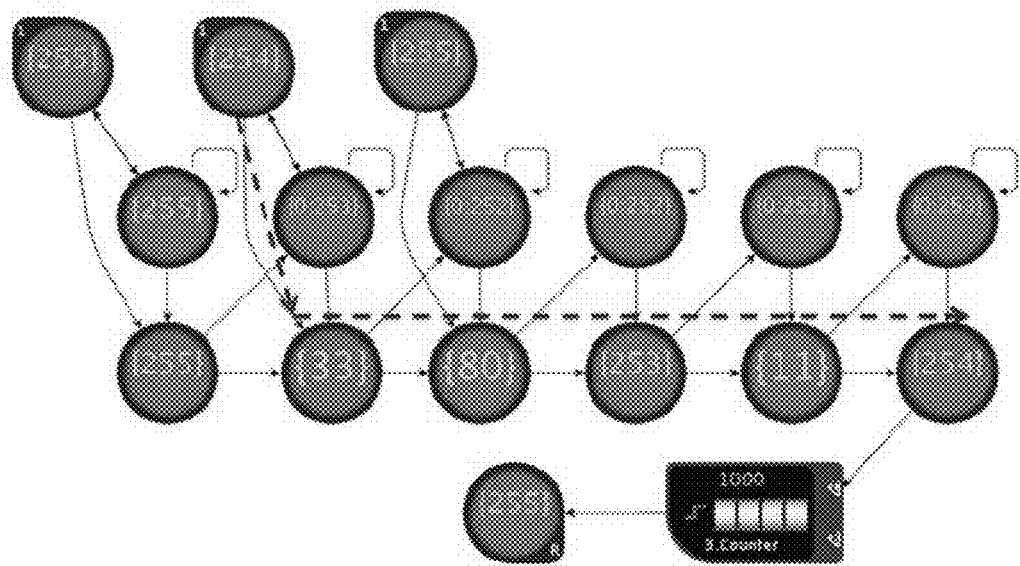
Figure 2:
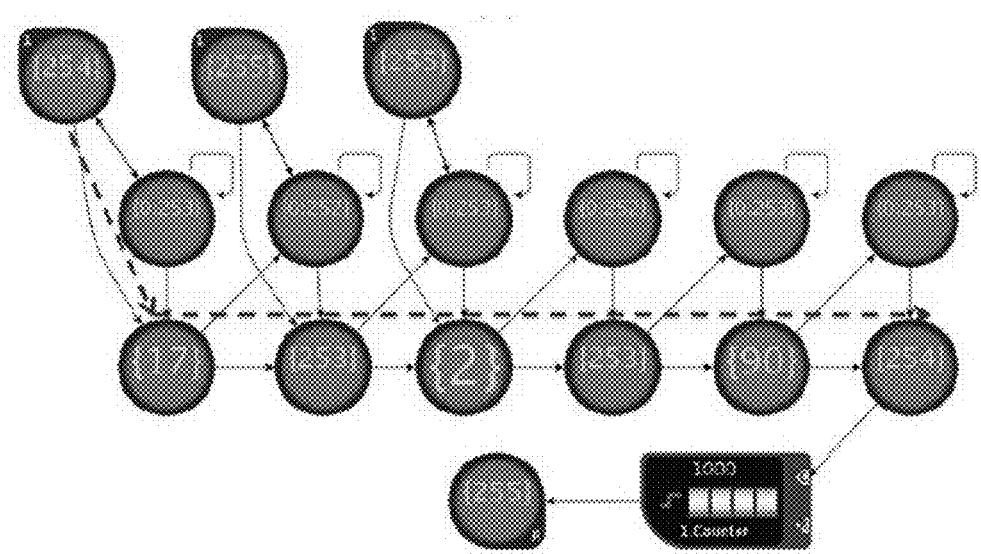

To solve this problem, the idea of multiple-entry NFAs is adopted for variable-size itemsets (ME-NFA-VSI) proposed by Wang [Document 22]. FIG. 2 shows an example of the ME-NFA-VSI structure that can handle all possible cases of sequences of effective length 3. FIG. 2(a) shows the ANML macro of this ME-NFA-VSI structure, leaving some parameters to be assigned for a specific sequence. % TD and % NTD are the sequence delimiter and its complement and are

TABLE 2

| Number of macros that fit into one block with 8-bit encoding | | | |
|---|---|---|---|
| | k <= 10 | 10 < k <= 20 | 20 < k <= 40 |
| sup < 4096 | 4 | 2 | 1 |
| sup >= 4096 | 2 | 2 | 1 | assigned to "254" and "0-253". % ER is the ending and reporting symbol of the input stream and is assigned to "255" in this paper. % e00-% e02 are symbols for three entries. Only one entry is enabled for a given sequence. % i00-% i04 are individual symbols of items and itemset delimiter. % p00-% p04 are the corresponding "position holders", To match and count a sequence of three itemsets (two itemset delimiters are introduced), the first entry is enabled by "254", the sequence delimiter, and the other two entries are blocked by "255" (FIG. 2(d)). The sequence matching will start at the left most item symbol, and handle the cases of <{X} {Y} {Z}>. Similarly, this structure can be configured to handle other situations by enabling a different entry point (FIGS. 2(c) and 2(d)).

Macro Selection and Capacity

The flattening strategy and multiple-entry strategy shrink the automata design space (the number of different automata design) of a sequential pattern of length k from $2^{k-1}$ patterns to a single pattern template, which makes it possible to pre-compile a library of automaton for each level k and load The appropriate one to the AP chip at runtime. In each level k, the different encoding schemes. 8-bit and 16-bit. and the support threshold (greater than 4095 or not) lead to four different automaton designs. To count a support number larger than 4095, two counters should be daisy-chained to behave as a larger counter. In this case, counters are more likely a limiting factor of the capacity.

The actual capacity of a macro may be limited by STEs. counters, or routing resources of the AP chip. A library of macro structures is developed and compiled all these macros with the i newest AP compiler (v1.7.17). Table 2 and 3 show the actual capacities of macros for the different encoding schemes, support number and level range. Note that across all datasets, a case of k larger than 20 is not encountered.

TABLE 3

| Number of macros that fit into one block with 16-bit encoding | | | |
|---|---|---|---|
| | k <= 5 | 5 < k <= 10 | 10 < k <= 20 |
| sup < 4096 | 4 | 2 | 1 |
| sup >= 4096 | 2 | 2 | 1 |

192 AP blocks per D480 AP chip; 6144 blocks per 32-chip AP board.

Program Infrastructure

Figure 3:
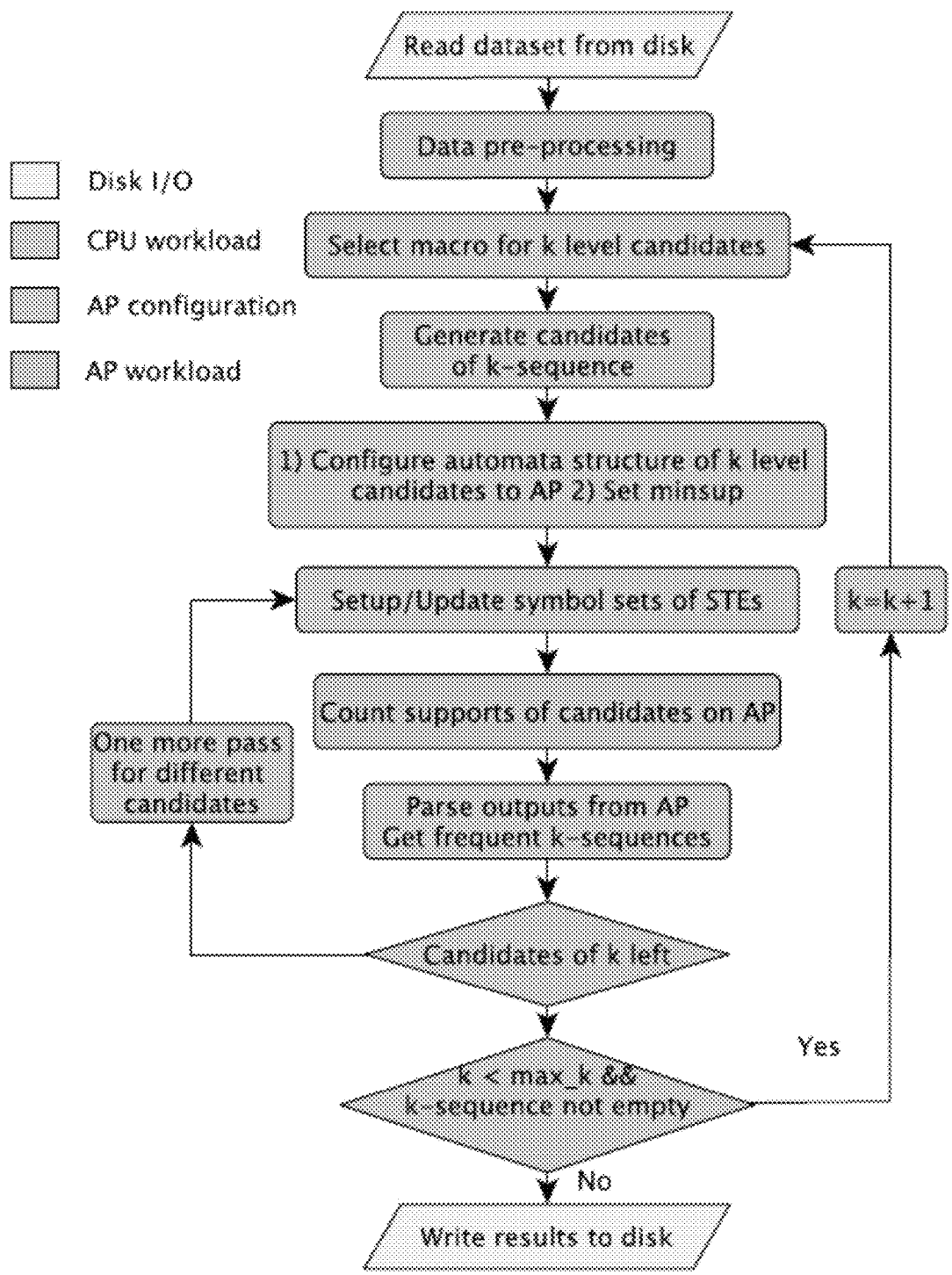
FIG. 3 illustrates the workflow of AP-accelerated SPM in accordance with some embodiments.

FIG. 3 shows the complete workflow of the AP-accelerated SPM described in the present invention. The data pre-processing step creates a data stream from the input dataset and makes the data stream compatible with the AP interface. Pre-processing consists of the following steps:

1. Filter out infrequent items from input sequences;
2. Recode items into 8-bit or 16-bit symbols;
3. Recode input sequences; and
4. Sort items within each itemset of input sequences, and connect itemsets and sequences.

Step 1 helps to avoid unnecessary computing on infrequent items and reduces the dictionary size of items. Depending on the number of frequent items, the items can be encoded by 8-bit (freq_item #<254) or 16-bit symbols (254<=freq_item #<=64009) in step 2. Different encoding schemes lead to different automaton designs and automaton capacities. Step 3 removes infrequent items from the input sequences, recodes items, and removes very short transactions (fewer than two items). Step 4 sorts items in each itemset (in airy given order) to fit the automaton ( design described in Section . The data pre-processing is only carried out once per workflow.

Each iteration of the outer loop shown in FIG. 3 explores all frequent k-sequences from the candidates generated from (k–1)-sequences. In the beginning of a new level, an appropriate precompiled template macro of automaton structure for sequential patterns is selected according to k, encoding scheme (8-bit or 16-bit), and the minimum support, and is configured onto the AP board with many instances spread out the whole board. The candidates are generated on the CPU and are filled info The instances of the selected automaton template macro. The input data formulated in pre-processing is then streamed into the AP board for matching and counting.

Mapping DRM onto the AP

The same flexible framework is adopted as previously described to develop a CPU-AP algorithm for disjunctive rule mining. Similarly, candidates of disjunctive rules are generated by an Apriori based algorithm. The performance bottleneck of this algorithm is still the matching-and-counting operation. How to accelerate this bottleneck by using the AP is described in the present invention.

Program Infrastructure

Figure 4:
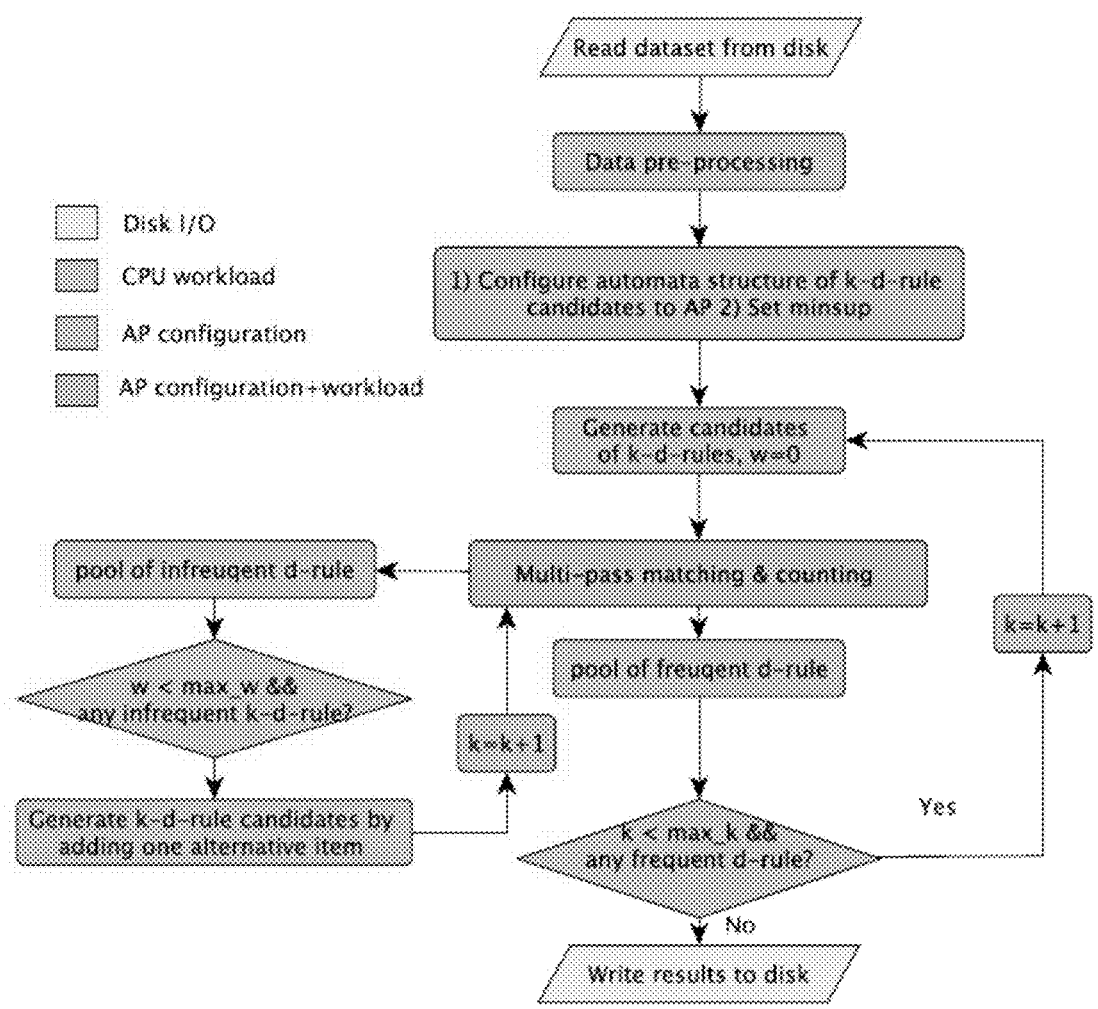
FIG. 4 illustrates the workflow of AP-accelerated DRM in accordance with some embodiments.

FIG. 4 shows The complete workflow of the AP-accelerated DRM described in the present invention. The data pre-processing step is similar to that for frequent itemset mining [Document 22] and SPM. However, the sorting operation is no longer needed. The outer loop is the d-rule size-increase iteration, which generates candidates of frequent (k+1)-d-rules from known frequent k-d-rules by a d-item without any alternative. The outer loop stops when no more frequent k-d-rule is found. The inner loop is the d-item expanding iteration, which generates candidates of frequent k-d-rules from known infrequent k-d-rules by adding one alternative item into any possible d-item each lime. The outer loop stops when no more infrequent k-d-rule is found. Although the algorithm to generate d-rule candidates could be improved, the delicate candidate generation algorithm is out of the scope of the present invention. Accelerating matching and counting d-rules by using the AP are focused.

Automaton for Matching and Counting

Similar to sequential patterns, a d-rule has a two-level hierarchy. In the lower level, the alternative items in one d-item follow OR relations. That is, any items in this d-item seen in the input stream will cause a match of this d-item. In the higher level, the d-items within a d-rule obey AND relations, and the d-rule matches a transaction when every its d-item matches an item in this transaction. The AP STE has a feature to hold a symbol set of 8-bit symbols instead of a single symbol. and any symbol of the symbol set seen in the input wilt cause a match of this STE. This feature is a part of the AP's bit-wise parallelism capability and could be naturally utilized to accommodate a d-item on an STE without any extra cost.

The linear design strategy, which flattens a hierarchical pattern to a plain string by presorting items within each itemset and connecting transactions with a delimiter symbol, is no longer applicable to a disjunctive mining problem. This is because a pre-defined item order of input transactions will cause false negatives when two non-conjunctive items appear in one d-item. For example, a dataset has only three items, 1,2,3. The linear design strategy only works well on two d-rules: 1 or 2,3 and 1, 2 or 3 when the pre-defined order lets 2 to be next to both 1 and 3. There are only two options: <1,2,3> or <3,2,1>. Given an input transaction <1,2,3>, a new d-rule 1 or 3,2 will cause a false negative on transaction 2, 3. No pre-defined order works well with 1 or 2, 3, 1, 2 or 3 and 1 or 3, 2 on all possible input transactions.

Boolean Based D-Rule Representation

To solve the problem described above, a novel automaton design strategy, reduction design, which works for disjunctive rule mining without a need of pre-sorting items in transactions, is introduced. The key idea of this automaton design is to lake advantage of bit-wise parallelism of an STE to represent the OR relation of alternative items in a d-item and utilize the on-chip Boolean elements to calculate AND relation among d-items of a d-rule.

Figure 5:
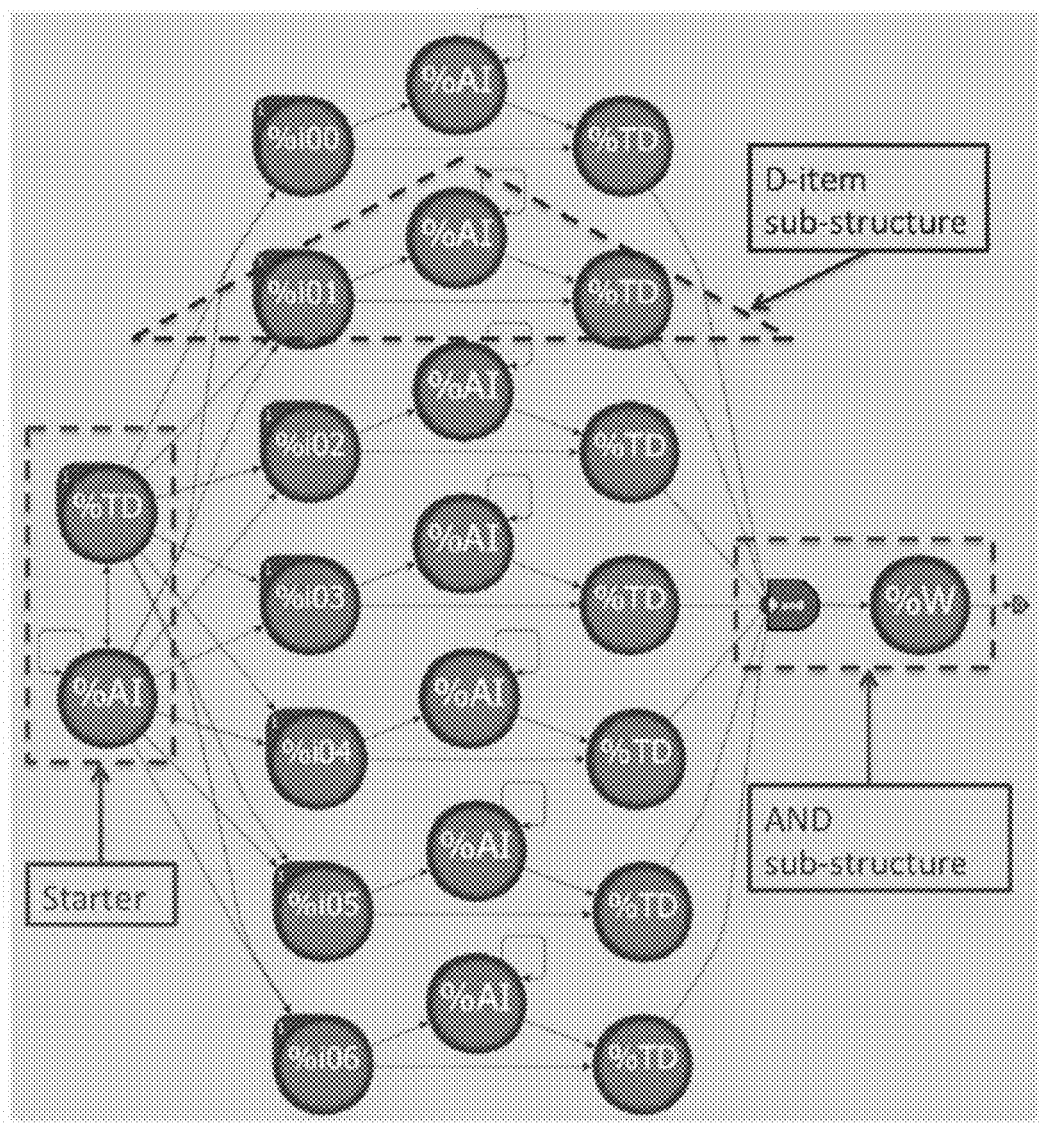
FIGS. 5(a)-(b) illustrate d-rule matching automaton in accordance with some embodiments, (a) shows d-rule matching sub-structure with parameters, (b) shows d-rule matching example {12/15,50,57,66/67,75}.
Figure 5:
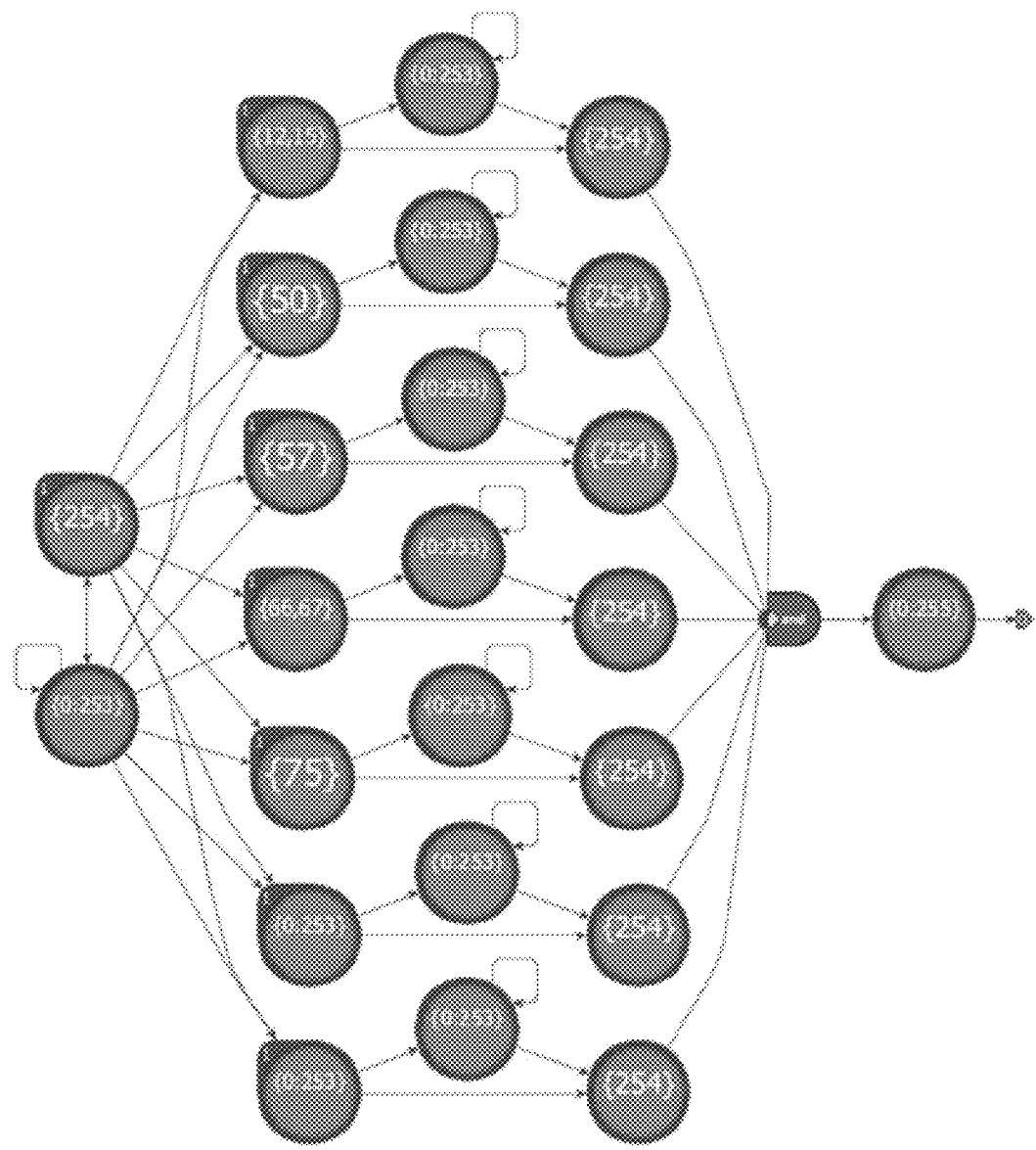

FIG. 5(*a*) shows the automaton design for d-rule matching. The d-rule matching automaton has three major components: starter, d-items sub-structure, and AND sub-structure. A starter has two STEs, the "% TD" STE represents the beginning of a new input transaction and activates all d-item sub-structures when matches a transaction delimiter; "% AI" STE matches any valid item and keeps activating all d-item sub-structures before the end of the current transaction. The left STE of d-item sub-structure holds the set of items in one d-item. The middle "% AI" STE holds the activated status of this d-item sub-structure until the end of the current transaction. The right "% TD" STE waits until the end of The current transaction to finish d-item matching. All the outputs of d-item sub-structure connect to the AND unit of an AND sub-structure. An AND unit of the current AP generation supports up to 7 fan-in connections. Therefore, up to 7 d-item sub-structures are available in this d-rule matching automaton. This automaton structure could be precompiled and loaded in the runtime. When fewer d-items are needed, the rest of the d-item sub-structures can be filled with "% AI", any valid item, to feed "true" to AND gate. The "% W" STE wildcard, matching any 8-bit symbol, simply separates the AND gate and counter or logic gate connected to this d-rule matching structure by paying one cycle of delay in the end of the whole input stream. However, without the wildcard STE, the Boolean and counter elements will connect to each other, which causes the clock rate of the whole AP chip to reduce to half the normal speed. In summary, the parallel d-item sub-structures seek d-items independently, and their results are collected by a "reduction" of AND to obtain the final output This automaton design strategy for pattern matching is called reduction design.

FIG. 5(*a*) shows an example of d-rule {12/15,50,57,66/ 67,75}. In the examples shown in present invention, the items are coded as digital numbers in the range from 0 to 253, with the numbers 255, 254 reserved as the data-ending reporting symbol and the itemset delimiter, respectively. That is, % AI=0-253, % TD=254, % ER=255, and % W=0-255. Therefore, the two unused d-items are filled with 0-253.

D-rule with Larger Size

Figure 6:
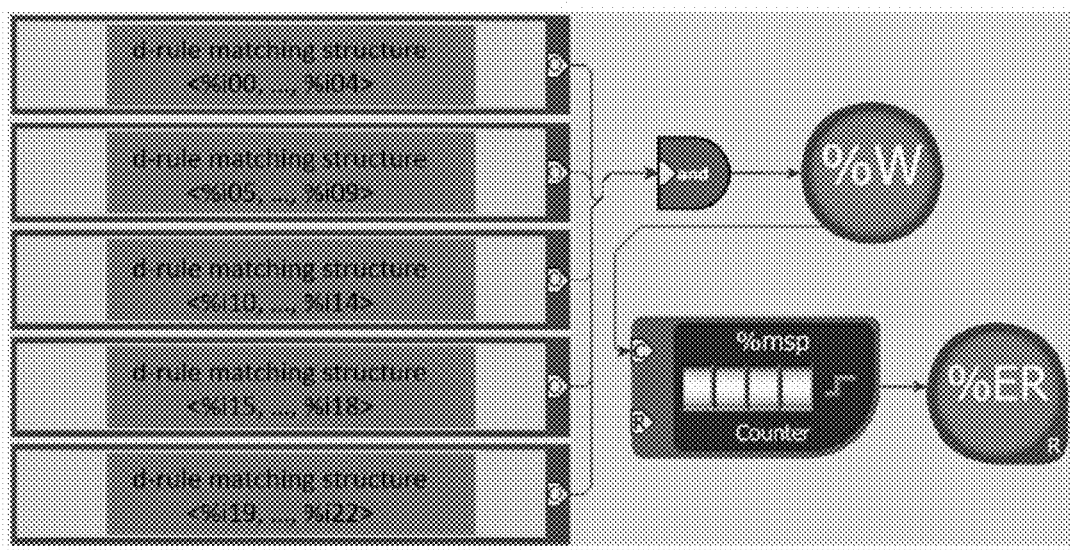
FIG. 6 illustrates a d-rule match wg-and-counting macro in accordance with some embodiments.

In many cases, a d-rule has more than 7 d-items. Another level at AND (reduction) sub-structure is described to connect several d-rule matching automata to extend to larger d-rules, as shown in FIG. 6. In theory, seven d-rule matching automata could be connected together to extend to 49 d-items. However, there is a trade-off between the total capacity of d-rule matching-and-counting macros and the size of d-rules. To fit two d-rule matching-and-counting automata in one AP block, the size of each d-rule automaton needs to be reduced An optimal configuration, shown in FIG. 6 with automata sizes of 5, 5. 5, 4, 4, representing a d-rule of size 23, can fit two macros in one AP block. Further automaton optimization and advanced placement and routing optimization may allow larger d-rule with The same capacity. However, 23 d-items are more than enough in practical cases of FIM and DRM. This automaton design can also be utilized for simple FIM problem. However, when compared with the linear design strategy that supports an itemset with up to 40 hems, an interesting trade-off between pattern size (number of items) and bit-wise parallelism (holding multiple symbols in one STE) is described.

Macro Selection and Capacity

Similar to SPM, one major factor in the AP performance is macro capacity. That is, macro capacity indicates how many macro instances can fit onto an AP board, which will directly affect the actual parallelism of the AP device. The different ranges of d-rule size and the max support number will lead to different automaton designs and therefore, different capacities. An automaton library of DRM macro structures is developed, and all different macros are compiled with the newest AP compiler (v1.7.17). Table 4 shows the capacity of DRM macros that can fit into one block for different d-rule sizes and support thresholds. In runtime, the appropriate macro should be selected and loaded onto the AP board before AP processing.

To count a support number larger than 4095, two counters should be daisy-chained to behave as a larger counter. Unlike the linear design for SPM, where the counter resource is a major limiting factor of the capacity, routing and STE capacity become important limitations in reduction design because of the routing hotspots of Boolean elements and more STE usage of a d-item sub-structure than that of an item representation in linear design. In order to support a larger size of symbol sets (e.g. 12 bits or $2^{12}$ different items) without changing the design, a new AP architecture, capable of handling larger symbol-set size, is needed. Alternatively, by changing the design and considering for different combinations of disjunctive items, current generation AP can also handle 16-bit encoding. The automaton design for 8-bit encoding is tested in the present invention.

TABLE 4

Number of macros that fit into one block with 8-bit encoding

| | k <= 7 | 7 < k <= 23 | 23 < k <= 33 |
|---|---|---|---|
| sup < 4096 | 4 | 2 | 1 |

| | k <= 23 | 23 < k <= 33 |
|---|---|---|
| sup >= 4096 | 2 | 1 |

Testing Platform and Datasets

The performance of our CPU-AP implementations of SPM and DRM are evaluated using CPU timers (CPU sequential parts), stated configuration latencies, and an AP simulator in the AP SDK [Documents 2 and 16], assuming a 32-chip Micron D480 AP board. Because the AP advances by one 8-bit symbol every clock cycle, the number of patterns that can be placed into the board, and the number of candidates that must be checked in each stage, determine how many passes through the input are required, which allows a simple calculation to determine the total time on the AP.

Testing Platform and Parameters

All of the above implementations are tested using the following hardware:
1. CPU: Intel CPU i7-5820K (6 physical cores, 3.30 GHz).
2. Memory: 32 GB, 1.333 GHz.
3. GPU: Nvidia Kepler K40C, 706 MHz clock, 2888 CUDA cores, 12 GB global memory.
4. AP: D480 board, 133 MHz clock, 32 AP chips (simulation).

Datasets

Datasets for SPM

Six public real-world datasets for sequential pattern mining available on the spmf [Document 11] website are tested. The details of these datasets are shown in Table 5. The RWS(1&2). Kosarak. and FIFA are clickstream data from an e-commerce site. Hungarian news portal and the website

TABLE 5

Datasets for sequential pattern mining

| Name | #sequences | Aver. Len. | #item | Size (MB) |
|---|---|---|---|---|
| BMS1 | 59601 | 2.42 | 497 | 1.5 |
| BMS2 | 77512 | 4.62 | 3340 | 3.5 |
| Kosarak | 69998 | 16.95 | 41270 | 4.0 |
| Bible | 36369 | 17.84 | 13905 | 5.4 |
| Leviathan | 5834 | 33.8 | 9025 | 1.3 |
| FIFA | 20450 | 34.74 | 2990 | 4.8 |

Aver. Len. = Average number of items per sequence.

of FIFA World Cup 98, respectively. The SPM studies on these four clickstream datasets are to discover the frequent click sequences of the corresponding applications. The Bible and Leviathan are sequence datasets generated from the Bible and the novel Leviathan (by Thomas Hobbes. 1651), considering each sentence as a sequence and each word as an item. The goal of SPM analysis on these two datasets is to discover the common word sequences in English (a natural language).

Datasets for DRM

One commonly-used real-world dataset. Webdocs, from the Frequent Itemset Mining Dataset Repository [Document 1] and one real-world dataset generated by ourselves (EN-Wiki; [Document 22]) are tested (details are shown in Table 6). The ENWiki is the English Wikipedia downloaded in December 2014. All paragraphs containing non-roman characters and all MediaWiki markups are removed The resulting dataset contains about 1,461,281 articles, 11,507,383 sentences (defined as transactions) with 6,322,092 unique words. A dictionary is constructed by ranking the words using Their frequencies. Capital letters are all converted into lower case and numbers are replaced with the special "NUM" word. Webdocs is a collection of web html documents after filtering out html tags and most common words. In natural language processing, the idea of deducing some aspects of semantic meaning from patterns of word co-occurrence is becoming increasingly popular. The goal of disjunctive rule mining on these two datasets is to compute such co-occurred word clusters with alternative words.

Experimental Results for SPM

Comparison with Other Implementations

The performance of the described AP-accelerated GSP (GSP-AP) is compared with the multi-threaded Java GSP implementation (GSP-JAVA) from spmf toolkit [Document 11], as well as a highly optimized GSP single-core CPU C implementation (GSP-1C), a multicore implementation using OpeoMP, (GSP-6C). and a GPU implementation (GSP-1G) of the GSP algorithm. The AP-accelerated GSP is compared with Java multi-threaded implementations of SPADE and PrefixSpan [Document 11]. Because GSP-1C is always faster than GSP-JAVA, the results of GSP-JAVA are not shown in the present invention. However, it is used as a baseline to determine the feasible ranges of minimum support number.

For each benchmark, the performance of the above implementations is compared over a range of minimum support values. A lower minimum support number requires a larger search space (because more candidates survive to the next generation) and more memory usage. Minimum support numbers that produce computation times of the GSP-JAVA are selected in the range of 2 seconds to 2 hours. A relative minimum support number, defined as the ratio of a minimum support number to the transaction number, is adopted in the figures.

Multicore and GPU GSP

In multicore and GPU implementations of GSP, the most time-consuming step, the matching and counting, is parallelized using OpenMP and CUDA.

GSP-GPU: After filtering out the infrequent items, the whole dataset is transferred to the GPU global memory. Then, the algorithm iterates over two steps: (1) generating (k+1)-sequence

TABLE 6

Datasets for disjunctive rule mining

| Name | Trans# | Aver. Len. | Item# | Size (MB) |
|---|---|---|---|---|
| Webdocs | 1692082 | 177.2 | 5267656 | 1434 |
| ENWiki | 11507383 | 70.3 | 6322092 | 2997.5 |

Aver. Len.—Average number of items per transaction.

candidates from the frequent k-sequences on CPU, and (2) identify the frequent (k+1)-sequences on GPU. In the CUDA kernel function, each thread is responsible for matching and counting one candidate in the input dataset. Once i he matching-and-counting phase is done for all the candidates of k+1 level, the results are transferred back to the CPU for the next level. Pruning in the candidate generation step (neither in AP nor in GPU implementation) is not considered as it increases pre-processing time and decreases the overall performance. An array data structure is used to contain candidates and the input dataset for GPU and AP implementations to optimize the performance of candidate pattern generation.

GSP-multi-core: Workflow is the same as the GSP-CPU implementation except that the matching-and-counting step is parallelized using OpenMP.

The CPU version uses a linked-list to accelerate the pruning and counting operations to achieve The best overall performance.

GSP-AP vs. Other GSP Implementations

Figure 7:
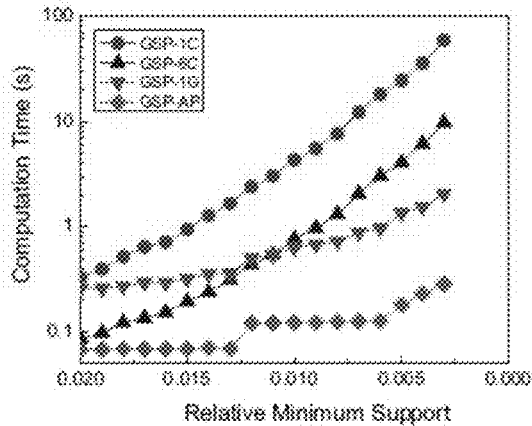
FIGS. 7(a)-(f) illustrate the performance comparison among GSP-1C, GSP-6C, GSP-1G, and GSP-AP on six benchmarks in accordance with some embodiments, (a) BMS1, (b) BMS2, (c) Leviathan, (d) Kosarak. (e) Bible, (f) FIFA.
Figure 7:
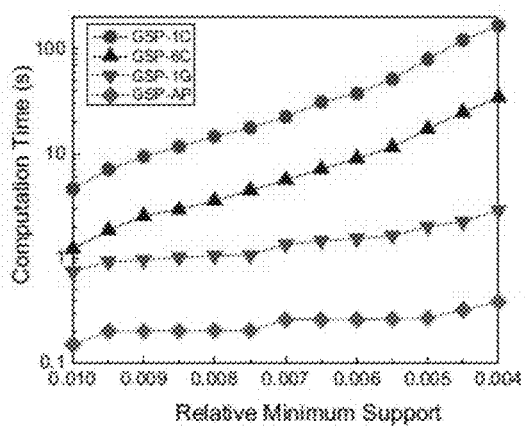
Figure 7:
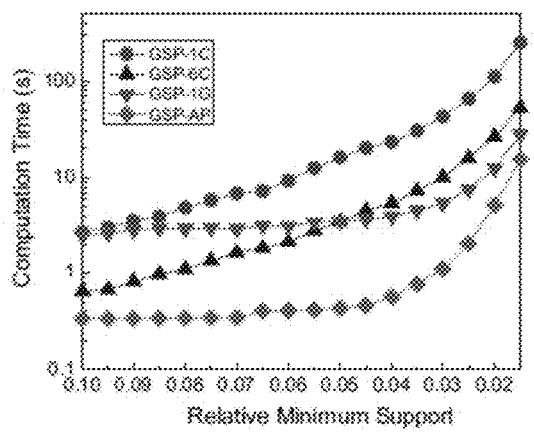
Figure 7:
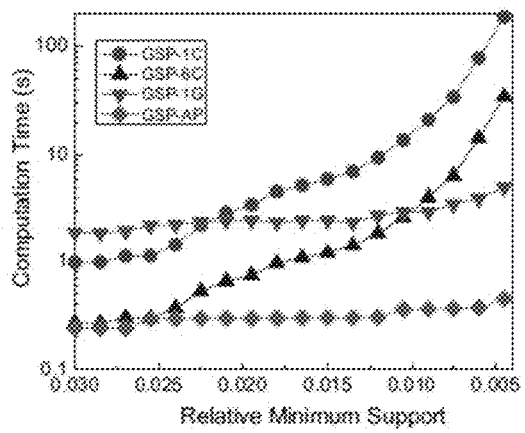
Figure 7:
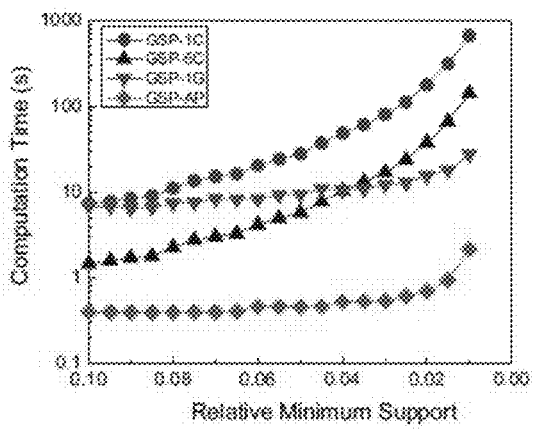
Figure 7:
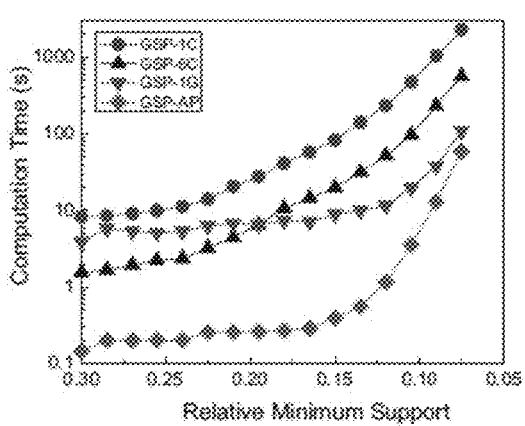

FIG. 7 shows the performance comparison among four different GSP implementations. As the minimum support number decreases, the computation time of each method increases, as a larger pattern search space is exposed. On average, the performance relationship among the four tested implementations follows this order GSP-1C<GSP-6C<GSP-1G<GSP-AP. The multicore GSP-6C achieves about 3.7×-6× speedup over single-core version GSP-1C. The CPU version outperforms GSP-1C up to 63×. GSP-1G shows belter performance than GSP-6C at large support numbers but loses al small ones. This indicates that more parallelism needs to be exposed for GPU implementation to compensate for the data transfer overhead between CPU and GPU. The described GSP-AP is the clear winner, with a max 430× (in the BMS2) speedup over single-core, up to 90× speedup over multicore, and 2-29× speedup over GPU.

Timing Breakdown and Speedup Analysis

Figure 8:
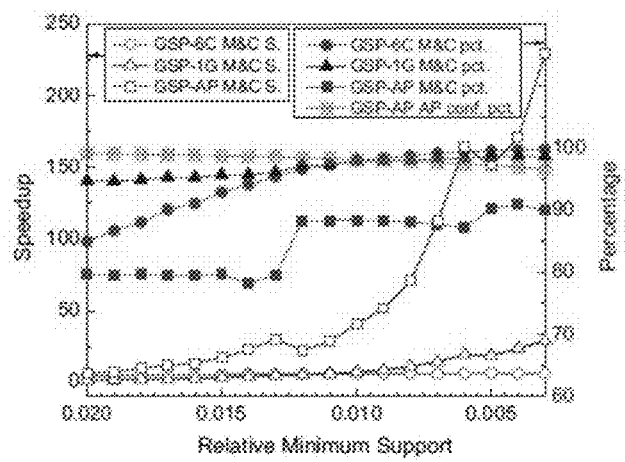
FIGS. 8(a)-(c) illustrate the timing breakdown and speedup analysis on GSP implementations in accordance with some embodiments. "M&C percentage" means the percentage of matching-and-counting steps within the total GSP execution time. "APconf. percentage" means the percentage of the AP configuration time, including both routing configuration time and symbol replacement time, in the total AP matching and counting time, (a) BMS1, (b)BMS2, (c) Kosarak.
Figure 8:
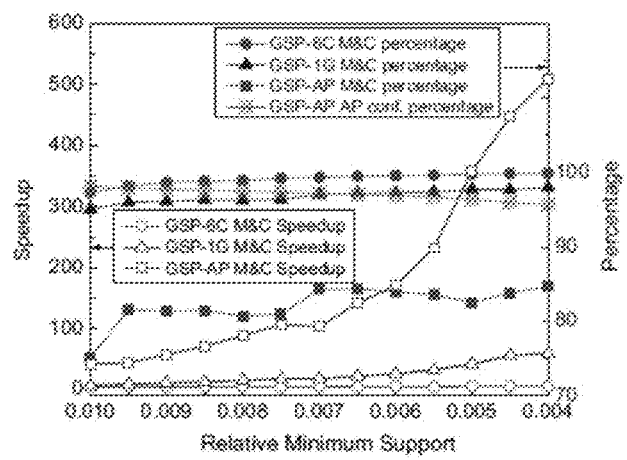
Figure 8:
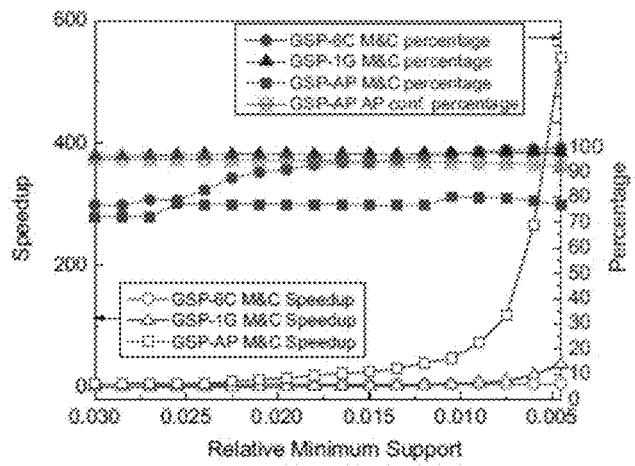
Figure 9:
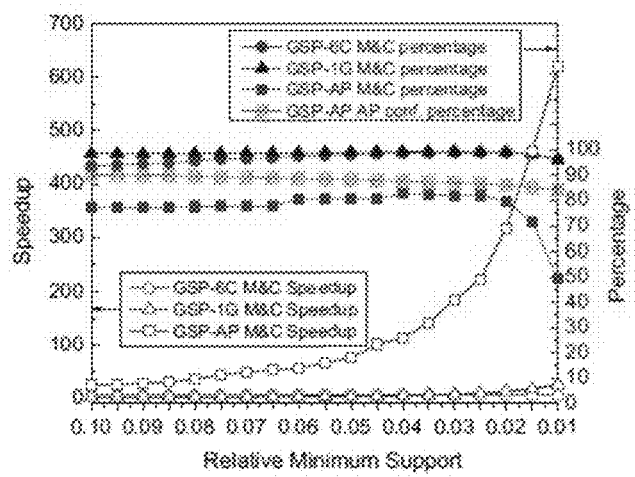
FIGS. 9(a)-(c) illustrate the timing breakdown and speedup analysis on GSP implementations in accordance with some embodiments, (a) Bible, (b) Leviathan, (c) FIFA.
Figure 9:
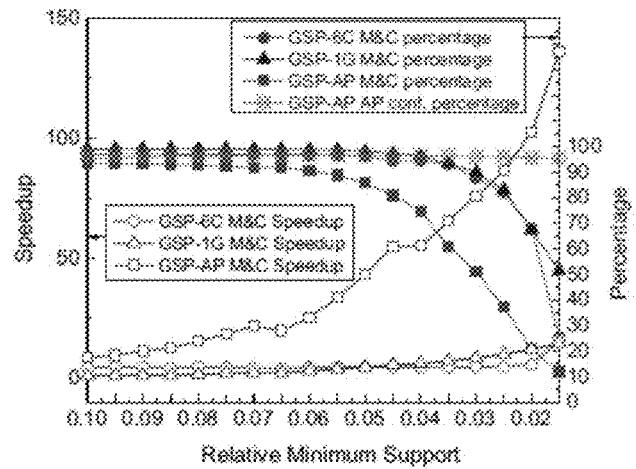
Figure 9:
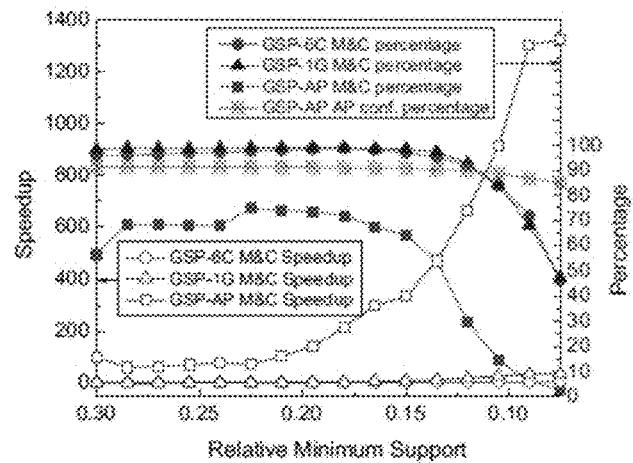

To better understand the performance shown in FIG. 7, profiling results are shown in FIGS. 8 and 9. Focusing on the matching-and-counting stage, the multi-core and GPU versions achieve 5× and lens-X speedups over single-core CPU implementation, while the AP implementation achieves several hundreds to 1300 times speedups over the sequential matching and counting implementation. The smaller the minimum support, the more candidates are generated, and the larger the speedups achieved for both GPU and AP versions. On one hand, it shows the performance boost of massive complex-pattern matching achieved by The AP. On The other hand, Amdahl's law starts to take effect at small support numbers, with the percentage of lime for matching and counting within the total execution time dropping, and the un-accelerated candidate-generation stage becoming dominant. This could be addressed by parallelizing candidate generation. Amdahl's law has even more severe impact on the AP version than on GPU implementation, FIFA is one typical example, where over 1300× speedup is achieved at 7.5% relative support, but the percentage of matching and counting drops to 3%.

Figure 10:
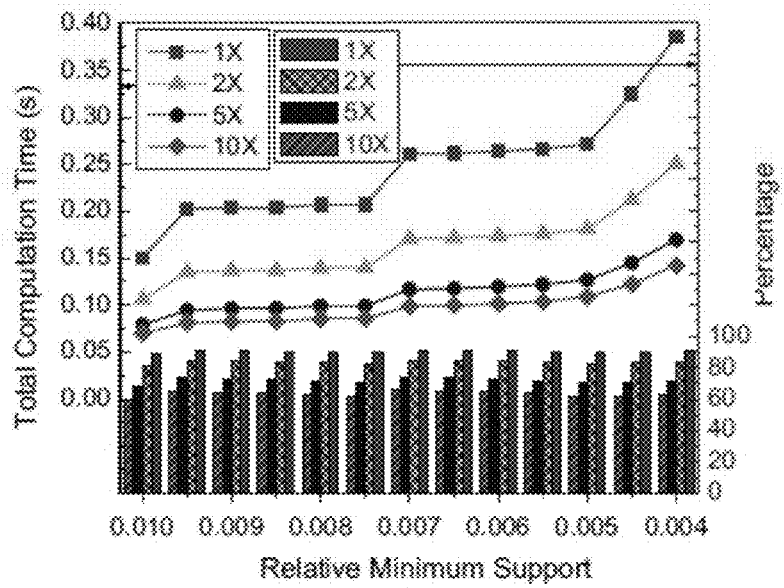
FIGS. 10(a)-(b) illustrate the impact of symbol replacement time on GSP-AP performance for BMS2 and Kosarak in accordance with some embodiments. The columns show the percentage of AP configuration time in total AP matching-and-counting time. The symbols and lines show overall all computation time, (a) BMS2, (b) Kosarak.
Figure 10:
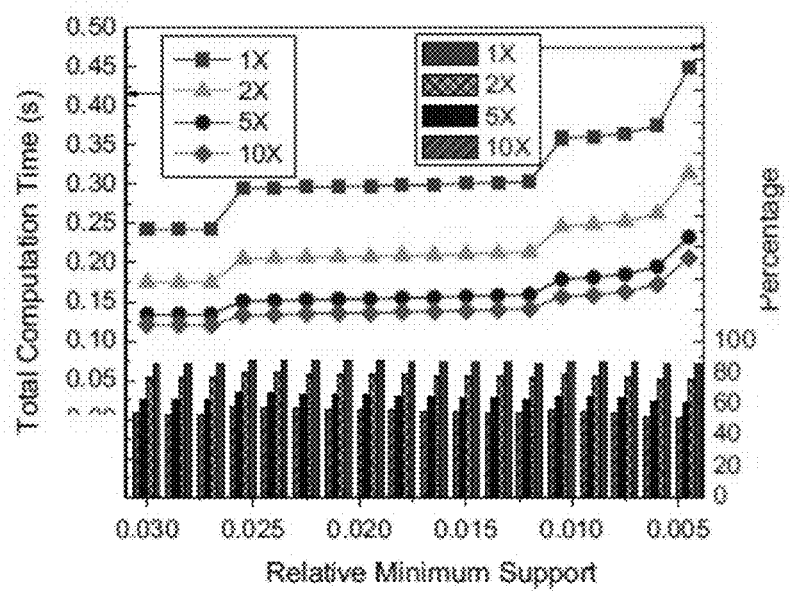

From FIGS. 8 and 9, it is observed that configuration time dominates the total AP matching-and-counting time, 80%-90% of the AP time for all cases. Fortunately, the latency of symbol replacement could be significantly reduced in future generations of the AP, because symbol replacement is simply a series of DRAM writes, and this should be much faster. If is hypothesized that the current times assume some conservative buffering. Reducing symbol replacement could improve the overall performance greatly. FIG. 10 studies the cases of BMS2 and Kosarak, assuming 2×, 5× and 10× faster symbol replacement. Up to 2.7× speedup is achieved over current AP hardware when assuming 10× faster symbol replacement.

GSP-AP vs. Other SPM Algorithms

Figure 11:
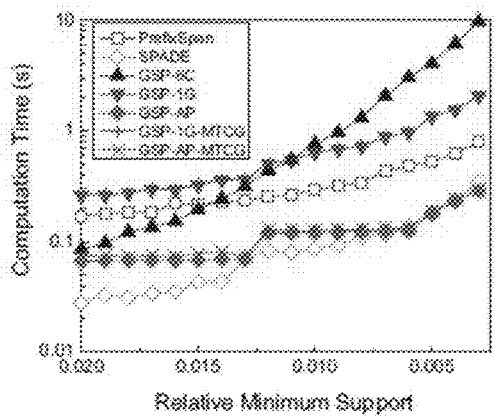
FIGS. 11(a)-(f) illustrate the performance comparison among GSP-GPU, GSP-AP, PrefixSpan, and SPADE in accordance with some embodiments, (a) BMS1, (b) BMS2, (c) Kosarak. (d) Bible, (c) Leviathan, (f) FIFA.
Figure 11:
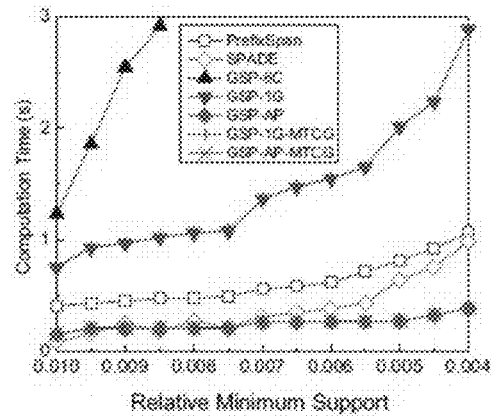
Figure 11:
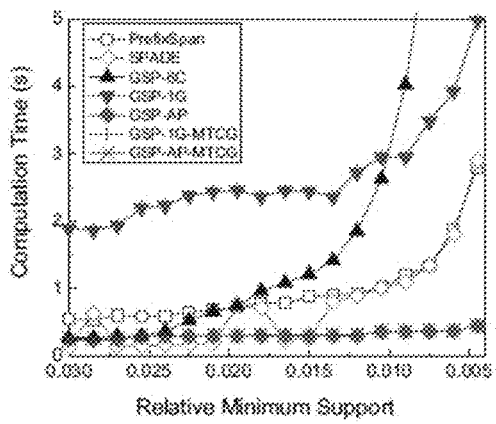
Figure 11:
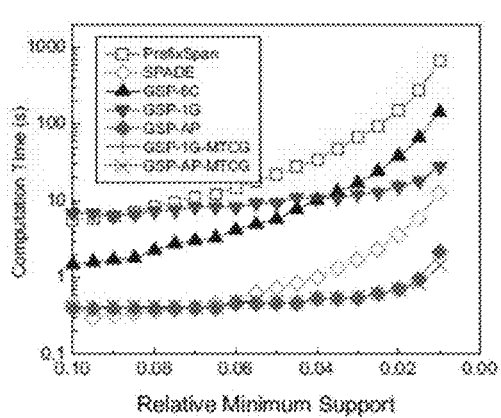
Figure 11:
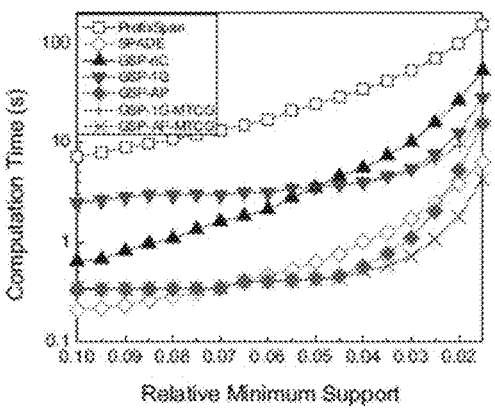
Figure 11:
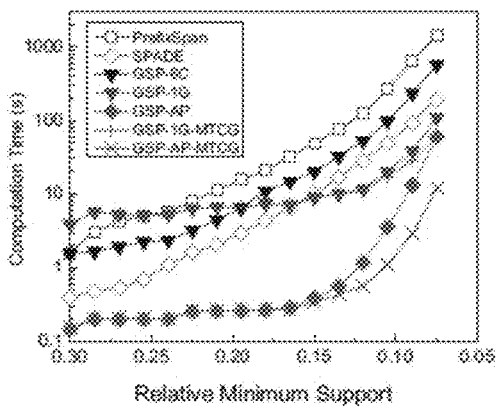

PrefixSpan and SPADE are two advanced algorithms which outperform GSP in general cases. In the present invention, multi-threaded Java implementations of these two algorithms are tested and evaluated on a multi-core CPU. FIG. 11 compares the performance of the Java multi-threaded implementations PrefixSpan and SPADE with hardware-accelerated GSP implementations. The performance of GSP-1G is in between PrefixSpan and SPADE on average. The described GSP-AP outperforms both PrefixSpan and SPADE in most cases, and achieves up to 300× speedup over PrefixSpan (in Bible) and up to 30× speedup over SPADE (in FIFA). As shown in the results, even multi-core PrefixSpan gives poor performance related to the AP. In addition, at least 50× speedup would be needed for PrefixSpan on the GPU to be competitive to the AP. Therefore, it is not implemented on the GPU. For SPADE, it is not implemented for the GPU as well, because it runs out of memory for benchmarks larger than 10 MB, assuming a high-end GPU with 24 GB memory, such as the Nvidia K80. Smaller GPUs will fail even earlier.

As described previously, the performance of the AP and GPU solutions suffer from the increasing portion of The un-accelerated candidate-generation stage. Therefore, a multi-threaded candidate generation version for the AP and the GPU. GSP-AP-MTCG, and GSP-1G-MTCG, is implemented. The performance improvements are clear in Bible, FIFA, and Leviathan, which become candidate-generation dominant at small minimum support numbers. The GSP-AP-MTCG get 452× speedup over PrefixSpan (in Bible) and up to 49× speedup over SPADE (in FIFA). The speedups of GSP-AP-MTCG over GSP-1G-MTCG become even larger because the same sequential stage is parallelized in the same way.

Performance Scaling with Data Size

In this era of "big data", mining must accommodate ever-larger data sets. The size of the original datasets adopted are all below 10 MB, which may once have been representative, but are less so for the future. The trend of the performance scaling as a function of input data sizes is studied. The input data size is enlarged by concatenating duplicates of the whole dataset with an assumption that the number of input sequences will grow much faster than the dictionary size (the number of distinct items) does.

Figure 12:
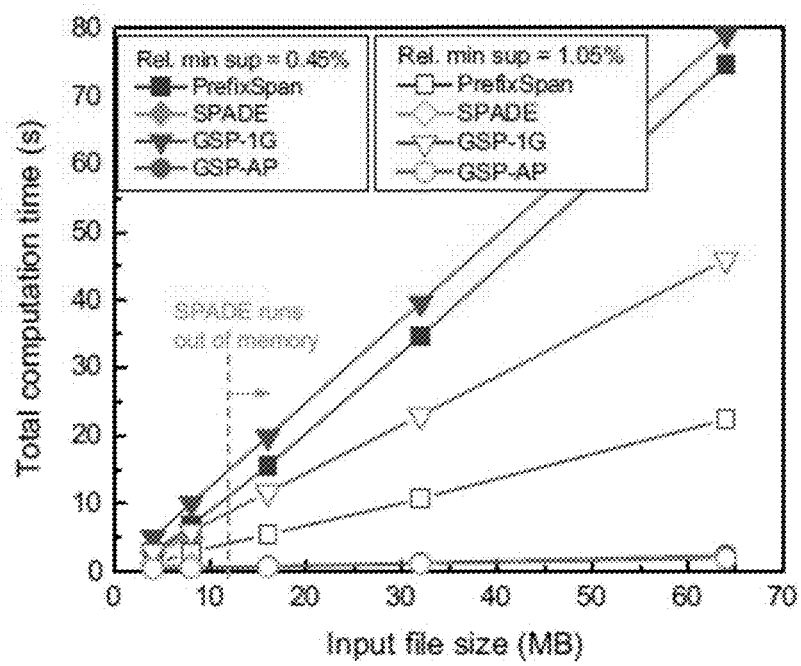
FIGS. 12(a)-(b) illustrate the performance scaling with input data size on Kosarak and Leviathan in accordance with some embodiments, (a) Kosarak, (b) Leviathan.
Figure 12:
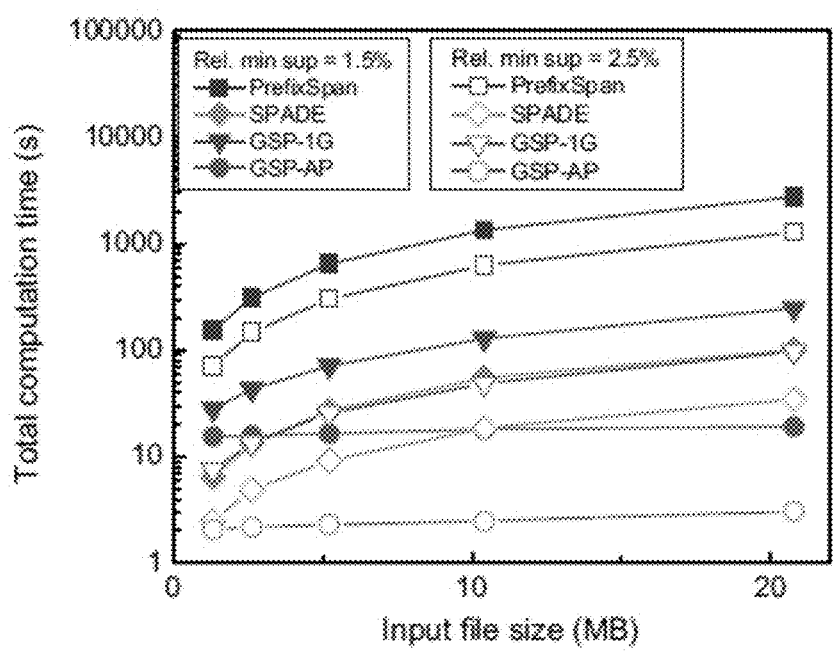

FIG. 12 shows the performance results of input data scaling on Kosarak and Leviathan. The total execution times of all tested methods, PrefixSpan, SPADE, GSP-1G, and GSP-AP, increase linearly with the input data size on both benchmarks. The SPADE method runs out of memory (32 GB on the CPU) few both tested minimum support numbers on Kosarak at input size larger than 10 MB. Given smaller GPU on-board memory, a GPU SPADE would fail at even smaller datasets. The execution lime of the described GSP-AP method scales much more favorably than other methods. Its speedup over PrefixSpan grows with larger data sizes, and reaches 31× at relative minimum support of 0.45%. A GPU implementation of PrefixSpan is unlikely to gain more speedup over the multi-threaded PrefixSpan described in the present invention. For these reasons, the GPU implementations of PrefixSpan and SPADE are not needed in this analysis. In the case of Leviathan, GSP-AP shows worse performance than SPADE at small datasets, but outperforms it at large datasets. In this case, GSP-AP achieves up to 420× speedup over PrefixSpan and 11× speedup over SPADE.

Experimental Results for DRM

Comparison with CPU Implementation

For each benchmark, the performance of CPU-AP implementation and a sequential CPU implementation are compared over a range of minimum support values. Similar to SPM, a lower minimum support number requires longer CPU time. To finish all experiments in a reasonable lime, minimum support numbers that produce computation times of the CPU-only implementation are selected in the range of 10 seconds to 20 hours. A relative minimum support number, defined as the ratio of a minimum support number to The transaction number, is adopted in the figures. For a single d-item, the extra items beyond one item are called alternative items. The number of alternative items in one d-item is defined as the size of the d-item minus one. To avoid an extremely large search space, only one alternative item (could be in any d-item) is allowed for end-to-end performance comparison, no matter how large The size of a d-rule is.

Figure 13:
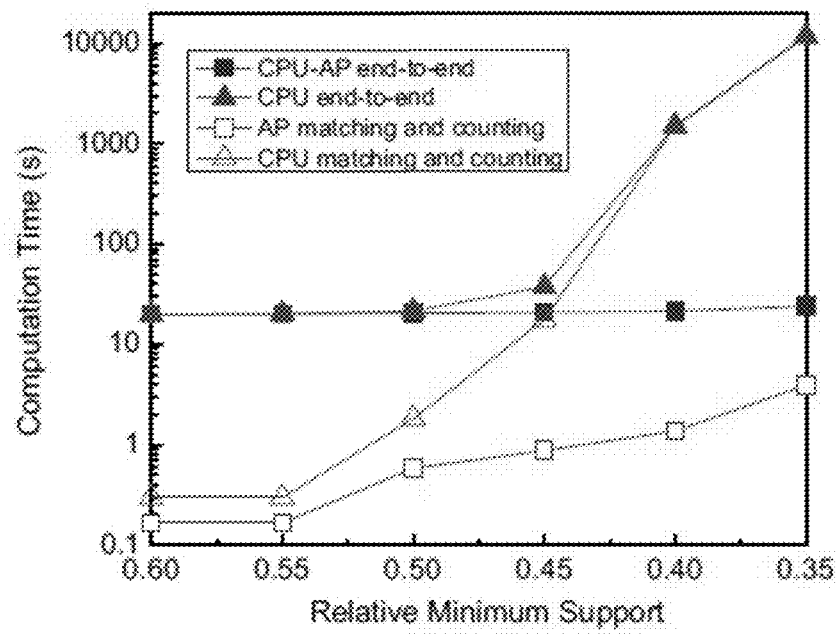
FIGS. 13(a)-(b) illustrate the performance comparison between CPU-AP DRM and CPU DRM in accordance with some embodiments, (a) Webdocs, (b) ENWiki.
Figure 13:
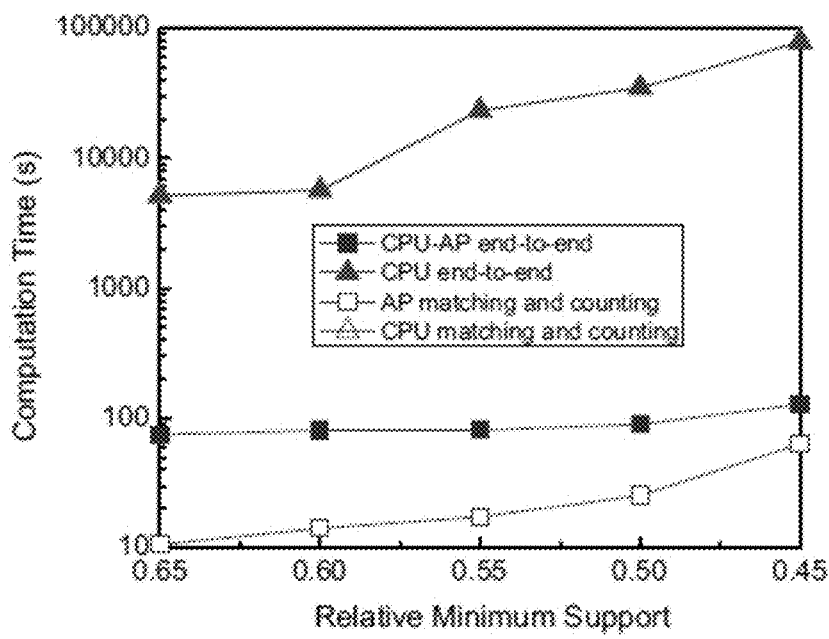

Considering disjunctive items, more candidates need to be scanned and more operations (or operations between disjunctive items) need to be calculated. Therefore, the matching-and-counting step is more likely to be a performance bottleneck than that of the traditional frequent itemset mining. FIG. 13 snows performance results of the CPU-AP solution and sequential CPU solution on datasets Webdocs and ENWiki. The CPU-AP DRM solution described in the present invention achieves up to 487× and 614× speedups for end-to-end computation time measurement over the CPU solution on Webdocs and ENWiki 2971× and 1366× speedups are achieved when comparing the d-rule matching-and-counting performances.

Matching and Counting

Figure 14:
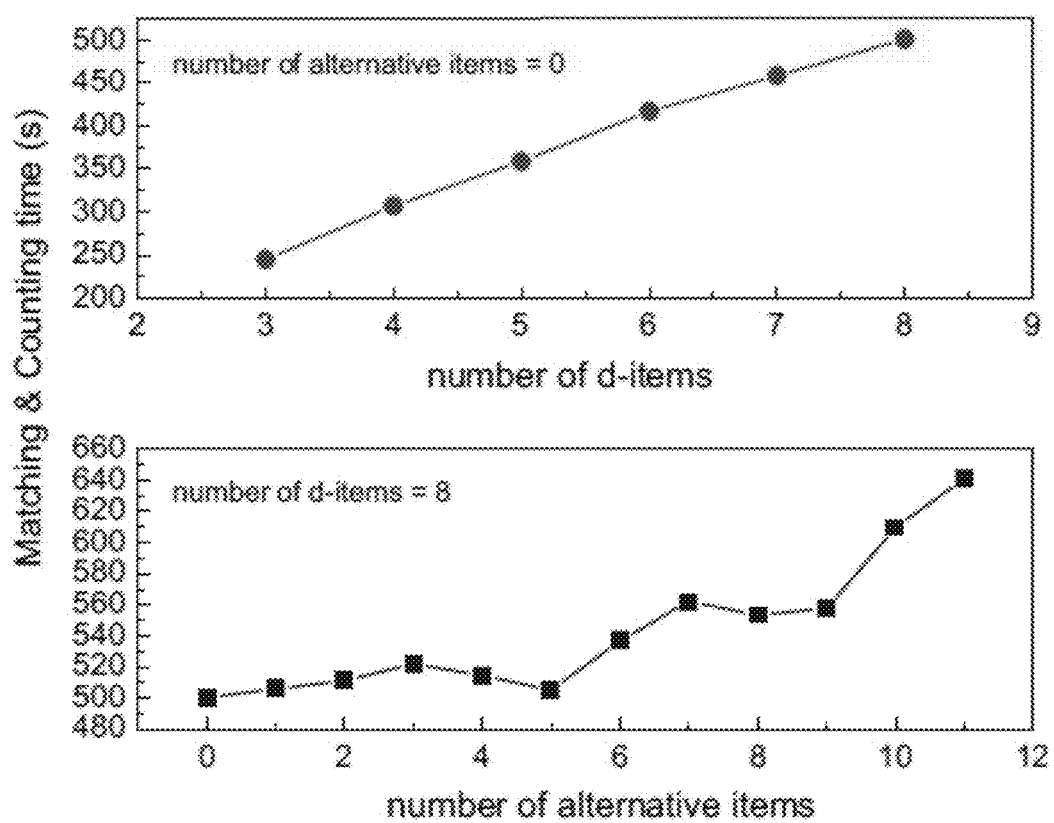
FIG. 14 illustrates the CPU time of matching and counting 20,000 d-rules against d-rule size and total number of alternative items in accordance with some embodiments. The corresponding AP matching and counting time is just 1.16 s for all the cases shown in this figure.

FIG. 14 shows the trends of the CPU matching-and-counting lime varying against d-rule site (d-item numbers of a d-rule) and total number of alternative items of a d-rule. The d-rules and input stream are all generated from the benchmark Webdocs. Adding one more d-item to an existing d-rule causes one extra AND operation when recognizing this d-rule. Adding one more alternative items to an existing d-rule causes extra one OR operation when recognizing this d-rule. FIG. 14 shows significant increase in the CPU time when increasing either d-rule size or alternative items. From the figure, one can expect even longer CPU time for larger d-rule sizes and more alternative items. The sub-linearly and the noise shown in this figure are all due to The short-circuit evaluation technique adopted to improve the CPU matching performance. In contrast, the AP matching-and-counting time keeps invariant if d-rule size is not larger than the design capacity of the d-rule automaton macro (for example, 23). Actually, in very rare cases, the mining will not slop before d-rule size reaches 20. Therefore, in practical cases, the AP DRM matching-and-counting time only depends on the number of d-rule candidates and the input length.

Figure 15:
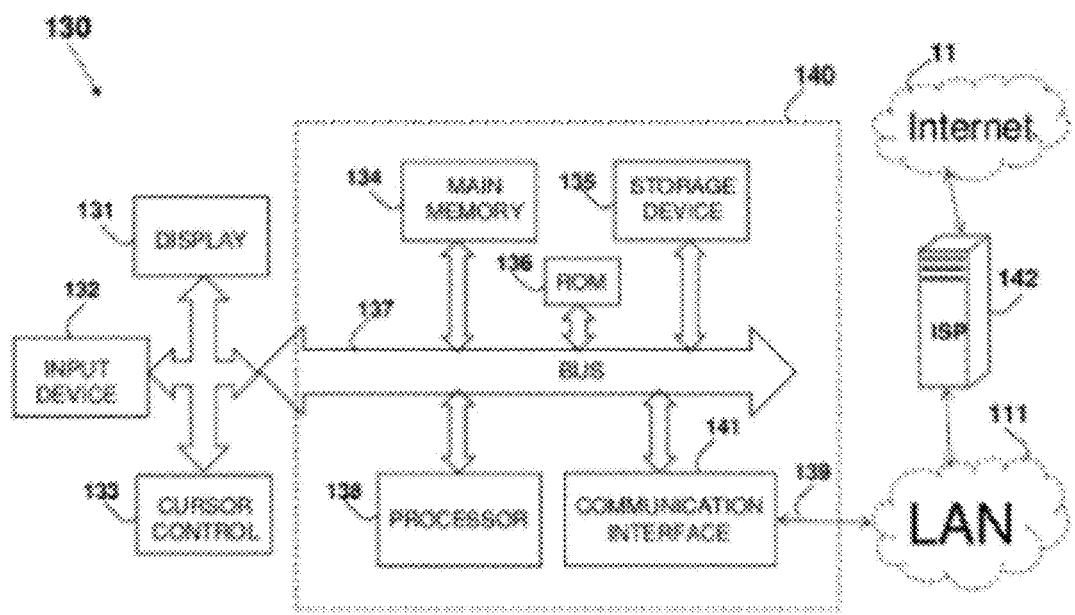
FIG. 15 is a block diagram that illustrates a system including a computer system and the associated Internet connection upon which, an embodiment, or a portion thereof, may be implemented in accordance with some embodiments.

Broad Scope of the Invention:

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the FIG. 15 is a block diagram that illustrates a system 130 including a computer system 140 and the associated Internet 11 connection upon which an embodiment, or a portion thereof, may be implemented. Such configuration is typically used for computers (hosts) connected to the Internet 11 and executing a server or a client for a combination) software. A source computer such as laptop, an ultimate destination computer and relay servers, for example, as well as any computer or processor described herein, may use the computer system configuration and the Internet connection shown in FIG. 15. The system 140 may be used as a portable electronic device such as a notebook/laptop computer, a media player (e.g., MP3 based or video player), a cellular phone, a Personal Digital Assistant (PDA), an image processing device (e.g., a digital camera or video recorder), and/or any other handheld computing devices, or a combination of any of these devices. Note that while FIG. 15 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used. The computer system of FIG. 15 may for example, be an Apple Macintosh computer or Power Book, or an IBM compatible PC. Computer system 140 includes a bus 137, an interconnect, or other communication mechanism for communicating information, and a processor 138, commonly in the form of an integrated circuit, coupled with bus 137 for processing information and for executing the computer executable instructions. Computer system 140 also includes a main memory 134, such as a Random Access Memory (RAM) or other dynamic storage device, coupled to bus 137 for storing information and instructions to be executed by processor 138.

Main memory 134 also may be used for storing temporary variables or other intermediate information during execution of instructions to be executed by processor 138. Computer system 140 further includes a Read Only Memory (ROM) 136 for other non-volatile memory) or other static storage device coupled to bus 137 for storing static information and instructions for processor 138. A storage device 135, such as a magnetic disk or optical disk, a hard disk drive for reading from and writing to a hard disk, a magnetic disk drive for reading from and writing to a magnetic disk, and/or an optical disk drive (such as DVD) for reading from and writing to a removable optical disk, is coupled to bus 137 for storing information and instructions. The hard disk drive, magnetic disk drive, and optical disk drive may be connected to the system bus by a hard disk drive interface, a magnetic disk drive interface, and an optical disk drive interface, respectively. The drives and their associated computer-readable media provide non-volatile storage of computer readable instructions, data structures, program modules and other data for the general purpose computing devices. Typically computer system 140 includes an Operating System (OS) stored in a non-volatile storage for managing the computer resources and provides the applications and programs with an access to the computer resources and interfaces. An operating system commonly processes system data and user input, and responds by allocating and managing tasks and internal system resources, such as controlling and allocating memory, prioritizing system requests, controlling input and output devices, facilitating networking and managing files. Non-limiting examples of operating systems are Microsoft Windows, Mac OS X, and Linux.

The term "processor" is meant to include any integrated circuit or other electronic device for collection of devices) capable of performing an operation on at least one instruction including, without limitation. Reduced Instruction Set Core (RISC) processors, CISC microprocessors. Microcontroller Units (MCUs), CISC-based Central Processing Units (CPUs), and Digital Signal Processors (DSPs). The hardware of such devices may be integrated onto a single substrate (e.g., silicon "die"), or distributed among two or more substrates. Furthermore, various functional aspects of the processor may be implemented solely as software or firmware associated with the processor.

Computer system 140 may be coupled via bus 137 to a display 131, such as a Cathode Ray Tube (CRT), a Liquid Crystal Display (LCD), a flat screen monitor, a touch screen monitor or similar means for displaying text and graphical data to a user. The display may be connected via a video adapter for supporting the display. The display allows a user to view, enter, and/or edit information that is relevant to the operation of the system. An input device 132, including alphanumeric and other keys, is coupled to bus 137 for communicating information and command selections to processor 138. Another type of user input device is cursor control 133, such as a mouse, a trackball, or cursor direction keys for communicating direction information and command selections to processor 138 and for controlling cursor movement on display 131. This input device typically has two degrees of freedom in two axes, a first axis (e.g., x) and a second axis (e.g., y), that allows the device to specify positions in a plane.

The computer system 140 may be used for implementing the methods and techniques described herein. According to one embodiment, those methods and techniques are performed by computer system 140 in response to processor 138 executing one or more sequences of one or more instructions contained in main memory 134. Such instructions may be read into main memory 134 from another computer-readable medium, such as storage device 135. Execution of the sequences of instructions contained in main memory 134 causes processor 138 to perform the process steps described herein. In alternative embodiments, hard-wired circuitry may be used in place of or in combination with software instructions to implement the arrangement. Thus, embodiments of the invention are not limited to any specific combination of hardware circuitry and software.

The term "computer-readable medium" (or "machine-readable medium") as used herein is an extensible term that refers to any medium or any memory, that participates in providing instructions to a processor, (such as processor 138) for execution, or any mechanism for storing or transmitting information in a form readable by a machine (e.g., a computer). Such a medium may store computer-executable instructions to be executed by a processing element and/or control logic, and data which is manipulated by a processing element and/or control logic, and may take many forms, including but not limited lo, non-volatile medium, volatile medium, and transmission medium. Transmission media includes coaxial cables, copper wire and fiber optics, including the wires that comprise bus 137. Transmission media can also lake the form of acoustic or light waves, such as those generated during radio-wave and infrared data communications, or other form of propagated signals (e.g., carrier waves, infrared signals, digital signals, etc.). Common forms of computer-readable media include, for example, a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 138 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infra-red transmitter to convert the data to an infra-red signal. An infra-red detector can receive the data carried in the infra-red signal and appropriate circuitry can place the data on bus 137. Bus 137 carries the data to main memory 134, from which processor 138 retrieves and executes the instructions. The instructions received by main memory 134 may optionally be stored on storage device 135 either before or after execution by processor 138.

Computer system 140 also includes a communication interface 141 coupled to bus 137. Communication interface 141 provides a two-way data communication coupling to a network link 139 that is connected to a local network 111. For example, communication interface 141 may be an Integrated Services Digital Network (ISDN) card or a modem to provide a data communication connection to a corresponding type of telephone line. As another non-limiting example, communication interface 141 may be a local area network (LAN) card to provide a data communication connection to a compatible LAN. For example, Ethernet based connection based on IEEE802.3 standard may be used such as 10/100BaseT, 1000BaseT (gigabit Ethernet), 10 gigabit Ethernet (10 GE or 10 GbE or 10 GigE per IEEE Std 802.3ae-2002 as standard), 40 Gigabit Ethernet (40 GbE), or 100 Gigabit Ethernet (100 GbE as per Ethernet standard IEEE P802.3ba), as described in Cisco Systems. Inc. Publication number 1-587005-001-3 (6799). "Internetworking Technologies Handbook", Chapter 7:"Ethernet Technologies", pages 7-1 to 7-38. which is incorporated in its entirety for all purposes as if fully set forth herein. In such a case, the communication interface 141 typically include a LAN transceiver or a modem, such as Standard Microsystems Corporation (SMSC) LAN91C111 10/100 Ethernet transceiver described in the Standard Microsystems Corporation (SMSC) data-sheet "LAN91C111 10/100 Non-PCI Ethernet Single Chip MAC+PHY" Data-Sheet, Rev. 15 (02-20-04), which is incorporated in its entirety for all purposes as if fully set forth herein.

Wireless links may also be implemented. In any such implementation, communication interface 141 sends and receives electrical, electromagnetic or optical signals that carry digital data streams representing various types of information.

Network link 139 typically provides data communication through one or more networks to other data devices. For example, network link 139 may provide a connection through local network 111 to a host computer or to data equipment operated by an Internet Service Provider (ISP) 142. ISP 142 in turn provides data communication services through the world wide packet data communication network Internet 11. Local network 111 and Internet 11 both use electrical, electromagnetic or optical signals that carry digital data streams. The signals through the various networks and The signals on the network link 139 and through the communication interface 141, which carry the digital data to and from computer system 140, are exemplary forms of carrier waves transporting the information.

A received code may be executed by processor 138 as it is received, and/or stored in storage device 135, or other non-volatile storage for later execution. In this manner, computer system 140 may obtain application code in the form of a carrier wave.

Accordingly, an aspect of an embodiment provides, but not limited thereto, a system, method and computer readable medium for power pad placement of power delivery networks (PDN), which is important in, for example, computer-automated-design (CAD) of integrated circuits. It should be appreciated that the related optimization system and method and the related networks, computer systems, internet, and components and functions may be implemented according to the scheme(s) disclosed herein.

Various embodiments or aspects of the invention, for example, can be implemented as software in a computing device, or alternatively, on hardware. An exemplary computing device in which an embodiment of the invention, or a portion thereof, can be implemented is schematically illustrated in FIG. 15. Although some aspects may be known, a brief explanation will be provided herein for the convenience of other readers.

Figure 16:
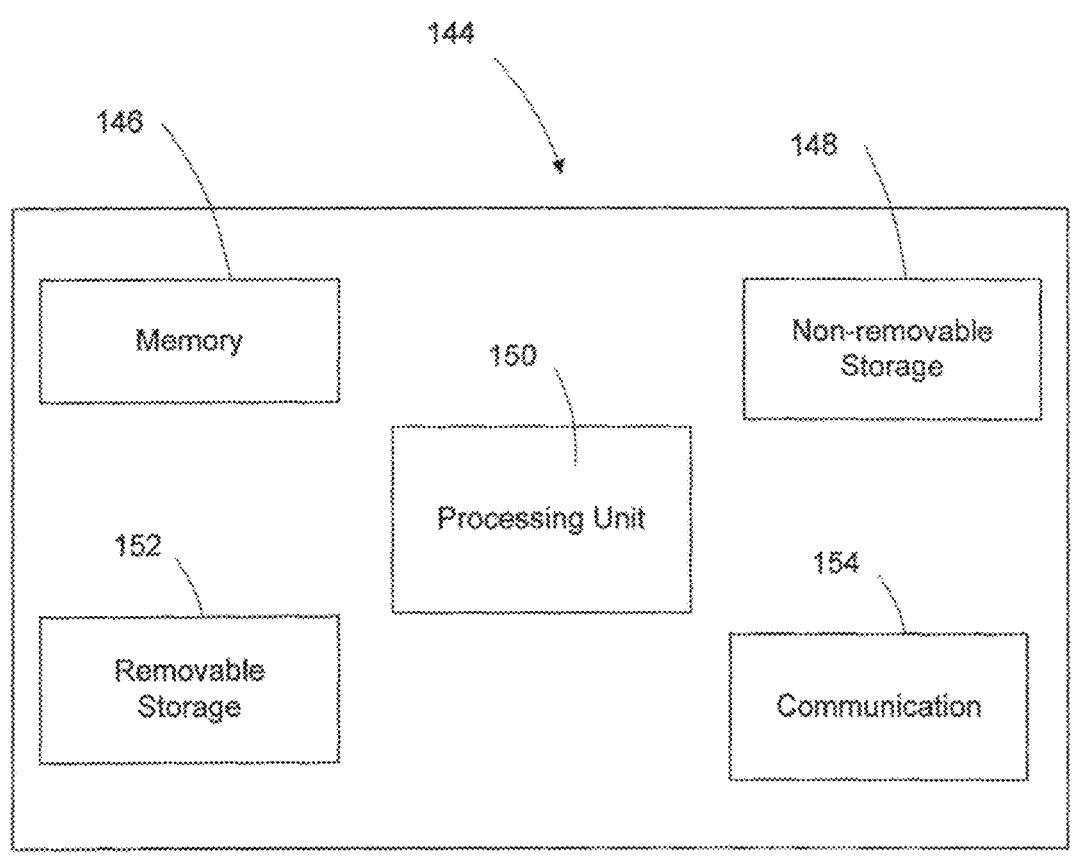
FIGS. 16 and 17 illustrate an exemplary computing device, in which an embodiment of the invention, or a portion thereof, can be implemented.

Referring to FIG. 16, in its most basic configuration, computing device 144 typically includes at least one processing unit 150 and memory 146. Depending on the exact configuration and type of computing device, memory 146 can be volatile (such as RAM), non-volatile (such as ROM, flash memory, etc.) or some combination of the two.

Additionally, device 144 may also have other features and/or functionality. For example, the device could also include additional removable and/or non-removable storage including, but not limited to, magnetic or optical disks or tape, as well as writable electrical storage media. Such additional storage is the figure by removable storage 152 and non-removable storage 148. Computer storage media includes volatile and nonvolatile, removable and non-removable media implemented in any method or technology for storage of information such as computer readable instructions, data structures, program modules or other data. The memory, the removable storage and the non-removable storage are all examples of computer storage media. Computer storage media includes, but is not limited to, RAM, ROM, EEPROM, Hash memory or other memory technology CDROM, digital versatile disks (DVD) or other optical storage, magnetic cassettes, magnetic tape, magnetic disk storage or other magnetic storage devices, or any other medium which can be used to store the desired information and which can accessed by the device. Any such computer storage media may be part of, or used in conjunction with, the device.

The device may also contain one or more communications connections 154 that allow the device to communicate with other devices (e.g., other computing devices). The communications connections carry information in a communication media. Communication media typically embodies computer readable instructions, data structures, program modules or other data in a modulated data signal such as a carrier wave or other transport mechanism and includes any information delivery media. The term modulated data signal means a signal that has one or more of its characteristics set or changed in such a manner as to encode, execute, or process information in the signal. By way of example, and not limitation, communication medium includes wired media such as a wired network or direct-wired connection, and wireless media such as radio, RF, infrared and other wirelevs media. As discussed above, the term computer readable media as used herein includes both storage media and communication media.

Figure 17:
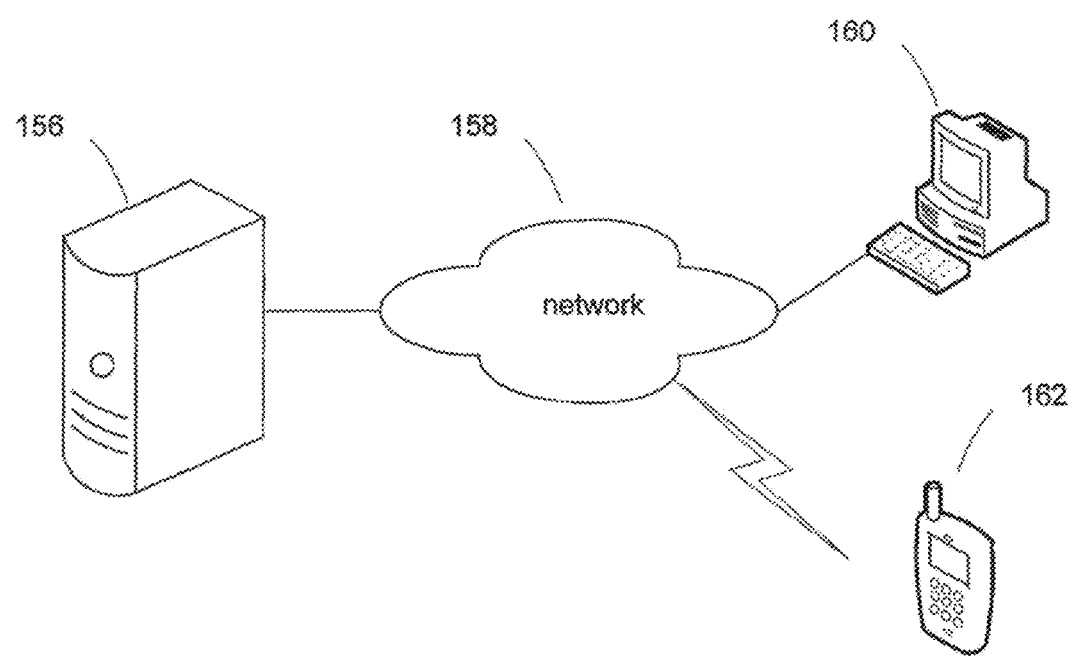

In addition to a stand-alone computing machine, embodiments of the invention can also be implemented on a network system comprising a plurality of computing devices that are in communication with a networking means, such as a network with an infrastructure or an ad hoc network. The network connection can be wired connections or wireless connections. As a way of example. FIG. 17 illustrates a network system in which embodiments of the invention can be implemented. In this example, the network system comprises computer 156 (e.g., a network server), network connection means 158 (e.g., wired and/or wireless connections), computer terminal 160, and PDA (e.g., a smart-phone) 162 tor other handheld or portable device, such as a cell phone, laptop computer, tablet computer, GPS receiver, mp3 player, handheld video player, pocket projector, etc. or handheld devices for non portable devices) with combinations of such features). The embodiments of the invention can be implemented in anyone of the devices of the system. For example, execution of The instructions or other desired processing can be performed on the same computing device that us anyone of 156, 160, and 162. Alternatively, an embodiment of the invention can be performed on different computing devices of the network system. For example, certain desired or required processing or execution can be performed on one of the computing devices of the network (e.g., server 156), whereas other processing and execution of the instruction can be performed at another computing device (e.g., terminal 160) of the network system, or vice versa. In fact, certain processing or execution can be performed at one computing device (e.g., server 156); and the other processing or execution of the instructions can be performed at different computing devices that may or may not be networked. For example, the certain processing can be performed at terminal 160, while the other processing or instructions are passed to device 162 where the instructions are executed. This scenario may be of particular value especially when the PDA device, for example, accesses to the network through computer terminal 160 for an access point in an ad hoc network). For another example, software to be protected can be executed, encoded or processed with one or more embodiments of the invention. The processed, encoded or executed software can then be distributed to customers. The distribution can be in a form of storage media (e.g., disk) or electronic copy.

Practice of an aspect of an embodiment for embodiments) of the invention is presented herein for illustration only and should not be construed as limiting the invention in any way.

An approach of the present invention systems and designs and optimization system and techniques may be based on the tools, programs and operating systems as discussed throughout this disclosure, such techniques can be applied to various hardware, tools, operating systems, virtual machine, PVM, or executable format.

Figure 18:
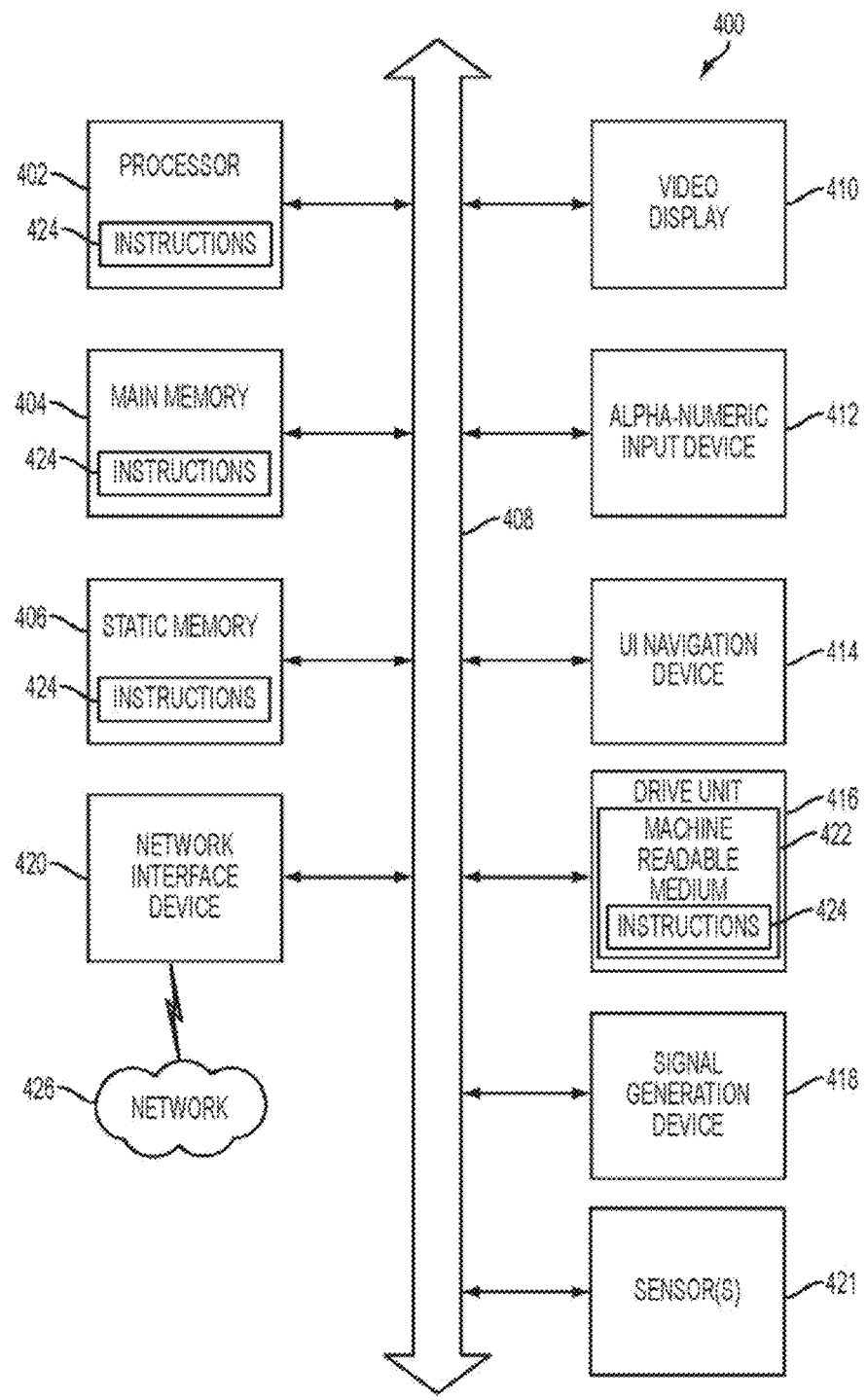
FIG. 18 is a block diagram illustrating an example of a machine upon which one or more aspects of embodiments of the present invention can be implemented.

FIG. 18 is a block diagram illustrating an example of a machine upon which one or more aspects of embodiments of the present invention can be implemented.

FIG. 18 illustrates a block diagram of an example machine 400 upon which one or more embodiments (e.g., discussed methodologies) can be implemented (e.g., run).

Examples of machine 400 can include logic, one or more components, circuits (e.g., modules), or mechanisms. Circuits are tangible entities configured to perform certain operations. In an example, circuits can be arranged (e.g., internally or with respect to external entities such as other circuits) in a specified manner. In an example, one or more computer systems (e.g., a standalone, client or server computer system) or one or more hardware processors (processors) can be configured by software (e.g., instructions, an application portion, or an application) as a circuit that operates to perform certain operations as described herein. In an example, the software can reside (1) on a non-transitory machine readable medium or (2) in a transmission signal. In an example, the software, when executed by the underlying hardware of the circuit, causes the circuit to perform the certain operations.

In an example, a circuit can be implemented mechanically or electronically. For example, a circuit can comprise dedicated circuitry or logic that is specifically configured to perform one or more techniques such as discussed above, such as including a special-purpose processor, a field programmable gate array (FPGA) or an application-specific integrated circuit (ASIC). In an example, a circuit can comprise programmable logic (e.g., circuitry, as encompassed within a general-purpose processor or other programmable processor) that can be temporarily configured (e.g., by software) to perform the certain operations. It will be appreciated that the decision to implement a circuit mechanically (e.g., in dedicated and permanently configured circuitry), or in temporarily configured circuitry (e.g., configured by software) can be driven by cost and time considerations.

Accordingly, the term circuit is understood to encompass a tangible entity, be that an entity that is physically constructed, permanently configured (e.g., hardwired), or temporarily (e.g., transitorily) configured (e.g., programmed) to operate in a specified manner or to perform specified operations. In an example, given a plurality of temporarily configured circuits, each of the circuits need not be configured or instantiated at any one instance in time. For example, where the circuits comprise a general-purpose processor configured via software, the general-purpose processor can be configured as respective different circuits at different times. Software can accordingly configure a processor, for example, to constitute a particular circuit at one instance of time and to constitute a different circuit at a different instance of time.

In an example, circuits can provide information to, and receive information from, other circuits. In this example, the circuits can be regarded as being communicatively coupled to one or more other circuits. Where multiple of such circuits exist contemporaneously, communications can be achieved through signal transmission (e.g., over appropriate circuits and buses) that connect the circuits. In embodiments in which multiple circuits are configured or instantiated at different times, communications between such circuits can be achieved, for example, through the storage and retrieval of information in memory structures to which the multiple circuits have access. For example, one circuit can perform an operation and store the output of that operation in a memory device to which it is communicatively coupled. A further circuit can then, at a later time, access the memory device to retrieve and process the stored output. In an example, circuits can be configured to initiate or receive communications with input or output devices and can operate on a resource (e.g., a collection of information).

The various operations of method examples described herein can be performed, al least partially, by one or more processors that are temporarily configured (e.g., by software) or permanently configured to perform the relevant operations. Whether temporarily or permanently configured, such processors can constitute processor-implemented circuits that operate to perform one or more operations or functions. In an example, the circuits referred to herein can comprise processor-implemented circuits.

Similarly, the methods described herein can be at least partially processor-implemented. For example, at least some of the operations of a method can be performed by one or processors or processor-implemented circuits. The performance of certain of the operations can be distributed among the one or more processors, not only residing within a single machine, but deployed across a number of machines. In an example, the processor or processors can be located in a single location (e.g., within a home environment, an office environment or as a server farm), while in other examples the processors can be distributed across a number of locations.

The one or more processors can also operate to support performance of the relevant operations in a "cloud computing" environment or as a "software as a service (SaaS). For example, at least some of the operations can be performed by a group of computers (as examples of machines including processors), with these operations being accessible via a network (e.g., the Internet) and via one or more appropriate interfaces (e.g., Application Program Interfaces (APIs).)

Example embodiments (e.g., apparatus, systems, or methods) can be implemented in digital electronic circuitry, in computer hardware, in firmware, in software, or in any combination thereof. Example embodiments can be implemented using a computer program product (e.g., a computer program, tangibly embodied in an information carrier or in a machine readable medium, for execution by, or to control the operation of, data processing apparatus such as a programmable processor, a computer, or multiple computers).

A computer program can be written in any form of programming language, including compiled or interpreted languages, and it can be deployed in any form, including as a stand-alone program or as a software module, subroutine, or other unit suitable for use in a computing environment. A computer program can be deployed to be executed on one computer or on multiple computers al one site or distributed across multiple sites and interconnected by a communication network.

In an example, operations can be performed by one or more programmable processors executing a computer program to perform functions by operating on input data and generating output. Examples of method operations can also be performed by, and example apparatus can be implemented as, special purpose logic circuitry (e.g., a field programmable gale array (FPGA) or an application-specific integrated circuit (ASIC)).

The computing system can include clients and servers. A client and server are generally remote from each other and generally interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine 400) and software architectures that can be deployed in example embodiments.

In an example, the machine 400 can operate as a stand-alone device or the machine 400 can be connected (e.g., networked) to other machines.

In a networked deployment, the machine 400 can operate in the capacity of either a server or a client machine in server-client network environments. In an example, machine 400 can act as a peer machine in peer-to-peer for other distributed) network environments. The machine 400 can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) specifying actions to be taken (e.g., performed) by the machine 400. Further, while only a single machine 400 is illustrated, the term machine shall also be taken to include any collection of machines that individually or jointly execute a set for multiple sets) of instructions to perform any one or more of the methodologies discussed herein.

Example machine (e.g., computer system) 400 can include a processor 402 (e.g., a central processing unit (CPU), a graphics processing unit (GPU) or both), a main memory 404 and a sialic memory 406, some or all of which can communicate with each other via a bus 408. The machine 400 can further include a display unit 410, an alphanumeric input device 412 (e.g., a keyboard), and a user interface (UI) navigation device 411 (e.g., a mouse). In an example, the display unit 410, input device 417 and UI navigation device 414 can be a touch screen display. The machine 400 can additionally include a storage device (e.g., drive unit) 416, a signal generation device 418 (e.g., a speaker), a network interface device 420, and one or more sensors 421, such as a global positioning system (GPS) sensor, compass, accelerometer, or other sensor.

The storage device 416 can include a machine readable medium 422 on which is stored one or more sets of data structures or instructions 424 (e.g., software) embodying or utilized by any one or more of the methodologies or functions described herein. The instructions 424 can also reside, completely or at least partially, within the main memory 404, within static memory 406, or within the processor 402 during execution thereof by the machine 400. In an example, one or any combination of the processor 402, the main memory 404, the static memory 406, or the storage device 416 can constitute machine readable media.

While the machine readable medium 422 is illustrated as a single medium, the term "machine readable medium" can include a single medium or multiple media (e.g., a centralized or distributed database, and/or associated caches and servers) that configured to store the one or more instructions 424. The term machine readable medium can also be taken to include any tangible medium that is capable of storing, encoding, or carrying instructions for execution by the machine and that cause the machine to perform any one or more of the methodologies of the present disclosure or that is capable of storing, encoding or canning data structures utilized by or associated with such instructions. The term machine readable medium can accordingly be taken to include, but not be limited to, solid-slate memories, and optical and magnetic media. Specific examples of machine readable media can include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 424 can further be transmitted or received over a communications network 426 using a transmission medium via the network interface device 420 utilizing any one of a number of transfer protocols (e.g., frame relay, IP, TCP, UDP, HTTP, etc.). Example communication networks can include a local area network (LAN), a wide area network (WAN), a packet data network (e.g., the Internet), mobile telephone networks (e.g., cellular networks). Plain Old Telephone (POTS) networks, and wireless data networks (e.g., IEEE 802.11 standards family known as Wi-Fi, IEEE 802.16 standards family known as WiMax), peer-to-peer (P2P) networks, among others. The term transmission medium shall be taken to include any intangible medium that is capable of storing, encoding or carrying instructions for execution by the machine, and includes digital or analog communications signals or other intangible medium to facilitate communication of such software.

Practice of an aspect of an embodiment for embodiments) of the invention is presented herein for illustration only and should not be construed as limiting the invention in any way. An approach of the present invention systems and designs and optimization system and techniques may be based on the tools, programs and operating systems as discussed throughout this disclosure, such techniques can be applied to various hardware, tools, operating systems, virtual machine, PVM, or executable format.

It will be apparent to those skilled in the art that various modifications and variations can be made in the disclosed embodiments of the present invention without departing from the spirit or scope of the invention. Thus, it is intended that the present invention covers the modifications and variations of the embodiments disclosed above provided that they come within the scope of any claims and their equivalents.

What is claimed is:

1. A processor for mining a plurality of patterns in large datasets, the processor comprises a plurality of functional element comprising:
   a plurality of state transition elements;
   a plurality of counters; and
   a plurality of Boolean elements,
   wherein the processor is configured to implement non-deterministic finite automata (NFA) with a reduction design method,
   wherein the reduction design method is used for disjunctive rule mining (DRM) with an Apriori-based algorithm, and
   wherein the disjunctive rule mining comprises the steps of:
   generating candidates; and
   matching and counting d-rules,
   wherein in the DRM, a d-rule is defined as a set of disjunctive items (d-items), $y_i = \{d_{s1}, d_{s2}, \ldots, d_{si}\}$.

2. The processor according to claim 1, wherein the matching and counting d-rules is performed by a d-rule matching automaton of the reduction design method, the d-rule matching automaton comprising:
   a plurality of starters;
   a plurality of d-item sub-structures; and
   a plurality of AND sub-structures,
   wherein the plurality of starters activate the plurality of d-item sub-structures during an input transaction, the plurality of d-item sub-structures match the d-items, and the plurality of AND sub-structures do AND operation on all of the plurality of d-item sub-structures within the same automaton.

3. The processor according to claim 2, wherein each of the plurality of starters comprises two state transition elements, a first state transition element of each of the plurality of starters represents the beginning of a new input transition and activates all d-item sub-structures when matches a transaction delimiter, and a second state transition element of each of the plurality of starters matches any valid item and keeps activating all d-item sub-structures before the end of the current transaction,
   wherein each of the plurality of d-item sub-structures comprises three state transition elements, a first state transition element of each of the plurality of d-item sub-structures holds a set of items in one d-item, a second state transition element of each of the plurality of d-item sub-structures holds an activated status of the d-item sub-structure until the end of the current transaction, and a third state transition element of each of the plurality of d-item sub-structures waits until the end of the current transaction to finish d-item matching, and
   wherein all outputs of the plurality of d-item sub-structures connect to an AND unit of the plurality of AND sub-structures.

4. The processor according to claim 2, wherein the d-rule matching automaton is pre-compiled and loaded in the runtime.

5. The processor according to claim 2, wherein bit-wise parallelism of the plurality of state transition elements is used to represent an OR relation of the alternative items in the d-item.

6. The processor according to claim 2, wherein the plurality of Boolean elements are utilized to calculate an AND relation among the d-items of the d-rule.

7. The processor according to claim 1, wherein the reduction design method does not require a sorting operation.

8. A method for mining a plurality of patterns in large datasets by a processor, the method comprising the steps of:
implementing non-deterministic finite automata (NFA) with a reduction design method on the processor, the processor comprising:
a plurality of state transition elements;
a plurality of counters; and
a plurality of Boolean elements,
wherein the reduction design method is used for disjunctive rule mining (DRM) with an Apriori-based algorithm, and
wherein the disjunctive rule mining comprises the steps of:
generating candidates; and
matching and counting d-rules,
wherein in the DRM, a d-rule is defined as a set of disjunctive items (d-items), $y_i = \{d_{s1}, d_{s2}, \ldots, d_{sl}\}$.

9. The method according to claim 8, wherein the matching and counting d-rules is performed by a d-rule matching automaton of the reduction design method, the d-rule matching automaton comprising:
a plurality of starters;
a plurality of d-item sub-structures; and
a plurality of AND sub-structures,
wherein the plurality of starters activate the plurality of d-item sub-structures during an input transaction, the plurality of d-item sub-structures match the d-items, and the plurality of AND sub-structures do AND operation on all of the plurality of d-item sub-structures within the same automaton.

10. The method according to claim 9, wherein each of the plurality of starters comprises two state transition elements, a first state transition element of each of the plurality of starters represents the beginning of a new input transition and activates all d-item sub-structures when matches a transaction delimiter, and a second state transition element of each of the plurality of starters matches any valid item and keeps activating all d-item sub-structures before the end of the current transaction,
wherein each of the plurality of d-item sub-structures comprises three state transition elements, a first state transition element of each of the plurality of d-item sub-structures holds a set of items in one d-item, a second state transition element of each of the plurality of d-item sub-structures holds an activated status of the d-item sub-structure until the end of the current transaction, and a third state transition element of each of the plurality of d-item sub-structures waits until the end of the current transaction to finish d-item matching, and
wherein all outputs of the plurality of d-item sub-structures connect to an AND unit of the plurality of AND sub-structures.

11. The method according to claim 9, wherein the d-rule matching automaton is pre-compiled and loaded in the runtime.

12. The method according to claim 9, wherein bit-wise parallelism of the plurality of state transition elements is used to represent an OR relation of the alternative items in the d-item.

13. The method according to claim 9, wherein the plurality of Boolean elements are utilized to calculate an AND relation among the d-items of the d-rule.

14. The method according to claim 8, wherein the reduction design method does not require a sorting operation.

* * * * *